US007453508B2

(12) United States Patent
Iwase et al.

(10) Patent No.: US 7,453,508 B2
(45) Date of Patent: Nov. 18, 2008

(54) CAMERA HAVING OPTICAL VIEWFINDER

(75) Inventors: Shigeru Iwase, Akishima (JP); Motoaki Kobayashi, Tachikawa (JP); Toshifumi Nakano, Sagamihara (JP)

(73) Assignee: Olympus Corporation, Tokyo (JP)

( * ) Notice: Subject to any disclaimer, the term of this patent is extended or adjusted under 35 U.S.C. 154(b) by 721 days.

(21) Appl. No.: 11/051,693

(22) Filed: Feb. 4, 2005

(65) Prior Publication Data
US 2005/0174464 A1    Aug. 11, 2005

(30) Foreign Application Priority Data
Feb. 9, 2004  (JP) ............................. 2004-032023
Apr. 9, 2004  (JP) ............................. 2004-115534

(51) Int. Cl.
*H04N 5/225*    (2006.01)
*G03B 7/099*    (2006.01)
*G02B 26/08*    (2006.01)
*G02B 5/08*     (2006.01)

(52) U.S. Cl. ....................... 348/335; 348/341; 348/344; 348/340; 348/374; 396/272; 359/214; 359/196; 359/223; 359/838

(58) Field of Classification Search ................. 348/335, 348/336, 337, 341, 343, 344, 345, 357; 359/196, 359/197, 198, 199, 200, 204, 205, 208, 209, 359/210, 211, 212, 213, 214, 215, 216, 220, 359/221, 223, 224, 225, 226, 227, 230, 231, 359/232, 233, 234, 235, 236, 237, 290, 298, 359/301, 302, 315, 318, 319, 320, 831, 833, 359/834, 837, 838, 855, 856, 857, 871; 396/272
See application file for complete search history.

(56) References Cited

U.S. PATENT DOCUMENTS

| 4,119,982 | A |   | 10/1978 | Imura et al. |         |
|-----------|---|---|---------|--------------|---------|
| 5,253,005 | A | * | 10/1993 | Koyama et al.|         |
| 5,628,038 | A | * | 5/1997  | Higashihara  |         |
| 6,456,797 | B1| * | 9/2002  | Boyd et al.  | 396/155 |
| 6,546,207 | B2| * | 4/2003  | Wakui        | 396/298 |
| 6,683,644 | B1| * | 1/2004  | Nakao et al. | 348/273 |
| 6,825,882 | B1| * | 11/2004 | Shono        | 348/341 |
| 2001/0045989 | A1| * | 11/2001 | Onuki    | 348/345 |

FOREIGN PATENT DOCUMENTS

JP    02-006934    *   1/1990

(Continued)

*Primary Examiner*—Ngoc-Yen T Vu
*Assistant Examiner*—Peter Chon
(74) *Attorney, Agent, or Firm*—Volpe and Koenig, P.C.

(57) ABSTRACT

In a camera system of this invention, a light beam coming from a photographing lens is reflected by a quick return mirror in the widthwise direction of a body unit, and is reflected by a second mirror via a half mirror and screen in the upward direction of the body unit except for some light beam components. The light beam reflected by the second mirror is reflected by a third mirror in a direction opposite to that of the light beam reflected by the quick return mirror, and is also reflected by a fourth mirror toward an eyepiece side in the back side of the body unit. Some light beam components reflected by the half mirror are fetched by an AF sensor unit to detect the focal point position of the photographing lens.

6 Claims, 12 Drawing Sheets

FOREIGN PATENT DOCUMENTS

| | | | |
|---|---|---|---|
| JP | 6-222432 | | 8/1994 |
| JP | 06-313844 | * | 11/1994 |
| JP | 07-175129 | * | 7/1995 |
| JP | 07-209744 | * | 8/1995 |
| JP | 07-225422 | * | 8/1995 |
| JP | 8-5900 | | 1/1996 |
| JP | 09-113795 | * | 5/1997 |
| JP | 10-031258 | * | 2/1998 |
| JP | 2002-365528 | | 12/2002 |
| JP | 2003-161993 | * | 6/2003 |

* cited by examiner

CAMERA HAVING OPTICAL VIEWFINDER

CROSS-REFERENCE TO RELATED APPLICATIONS

This application is based upon and claims the benefit of priority from the prior Japanese Patent Applications No. 2004-032023, filed Feb. 9, 2004; and No. 2004-115534, filed Apr. 9, 2004, the entire contents of both of which are incorporated herein by reference.

BACKGROUND OF THE INVENTION

1. Field of the Invention

The present invention relates to a camera and, more particularly, to the layout of the components of a camera that has a TTL (through-the-lens) viewfinder mechanism.

2. Description of the Related Art

As a conventional technique associated with a TTL viewfinder and automatic focus detection, that of a single-lens reflex type using a roof prism is known. The single-lens reflex camera includes a quick return mirror which is flipped vertically, a screen which is arranged above the quick return mirror, a roof prism which is arranged above the screen, and an eyepiece which is arranged behind the roof prism.

In this type, Japanese Patent Laid-open Nos. 6-313844 and 7-175129 disclose an example in which the optical path is bent downward by a sub mirror arranged behind a quick return mirror, and an automatic focus detection device is arranged below a space where the quick return mirror is arranged.

In such conventional camera, Japanese Patent Laid-open Nos. 6-313844 and 7-175129 above and Japanese Patent Laid-open No. 7-225422 describe an example in which a control circuit and capacitor of a flash emission device are arranged in the grip of the camera.

As a technique associated with a TTL viewfinder, a technique using a Porro prism is known. More specifically, this technique has a movable reflection mirror which reflects a light beam sideward of a camera, a mirror which reflects the light beam reflected by the movable reflection mirror forward of the camera, and a triangular prism which reflects the light beam reflected by the mirror upward of the camera, and then reflects that light beam backward of the camera. For example, Japanese Patent Laid-open No. 7-209744 discloses an example in which a capacitor and an emission unit of a flash emission device are arranged on the rear surface side of the mirror and the reflection surface of the triangular prism.

BRIEF SUMMARY OF THE INVENTION

It is a feature of the present invention to provide a compact camera by laying out a viewfinder without increasing a camera height.

It is another feature of the present invention to provide a compact single-lens reflex camera which incorporates a flash emission device.

The first feature of the present invention is a camera comprising:

a first reflection surface which reflects in a predetermined direction a light beam coming from an imaging optical system;

an optical path splitting unit which is arranged on a reflection optical axis of the first reflection surface, reflects at least some light components of the reflected light beam from the first reflection surface in a predetermined direction, and allows some other light components of the reflected light beam from the first reflection surface to pass through in a direction that agrees with the reflection optical axis of the first reflection surface; and a focal point position detection unit which detects a focal point position of the imaging optical system using the reflected light beam from the optical path splitting unit.

The second feature of the present invention is a camera comprising:

a first reflection surface that reflects a light beam, which comes from an imaging optical system, in a first direction that is a longitudinal direction of a photographing visual field range;

a second reflection surface which is arranged on a reflection optical axis of the first reflection surface, and reflects the reflected light beam from the first reflection surface in a second direction substantially perpendicular to the first direction;

a third reflection surface which is arranged on a reflection optical axis of the second reflection surface, and reflects the reflected light beam from the second reflection surface in a third direction which is substantially parallel to the first direction and is opposite to the first direction;

a fourth reflection surface which is arranged on a reflection optical axis of the third reflection surface, and reflects the reflected light beam from the third reflection surface in a direction which substantially agrees with an incoming direction of the light beam which comes from the imaging optical system;

an eyepiece optical system which is arranged on a reflection optical axis of the fourth reflection surface and is used to observe an image formed by the imaging optical system;

a flash emission device which has an emission unit that emits light toward an object; and a first charge accumulation member which accumulates a charge for causing the emission unit to emit light, the first charge accumulation member being arranged on a back surface side of at least one of the second and third reflection surfaces.

The third feature of the present invention is a camera comprising:

a grip which serves as a gripping portion of the camera;

an exterior member which has a first side surface which is substantially perpendicular to a side surface on the grip side, a second side surface which is substantially perpendicular to the first side surface and substantially faces the side surface on the grip side, and a third side surface which is substantially perpendicular to the second side surface, and substantially faces the first side surface;

a first reflection surface which reflects, in a first direction toward the second side surface side, a light beam coming from an imaging optical system;

a second reflection surface which is arranged on a reflection optical axis of the first reflection surface, and reflects the reflected light beam from the first reflection surface in a second direction which is substantially perpendicular to the first direction and is directed to the third side surface;

a third reflection surface which is arranged on a reflection optical axis of the second reflection surface, and reflects the reflected light beam from the second reflection surface in a third direction, which is substantially parallel to the first direction and is directed to the grip side;

a fourth reflection surface which is arranged on a reflection optical axis of the third reflection surface, and reflects the reflected light beam from the third reflection surface in a direction which substantially agrees with an incoming direction of the light beam coming from the imaging optical system;

an eyepiece optical system which is arranged on a reflection optical axis of the fourth reflection surface, and is used to observe an image formed by the imaging optical system;

a flash emission device which has an emission unit that emits light toward an object; and a first charge accumulation member which accumulates a charge for causing the emission unit to emit light, wherein the first charge accumulation member is arranged in a first triangular region bounded by the second reflection surface and the first and second side surfaces or in a second triangular region bounded by the third reflection surface and the second and third side surfaces.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below serve to explain the principles of the invention.

DETAILED DESCRIPTION OF THE INVENTION

Preferred embodiments of the present invention will be described hereinafter with reference to the accompanying drawings.

FIRST EMBODIMENT

Figure 1:
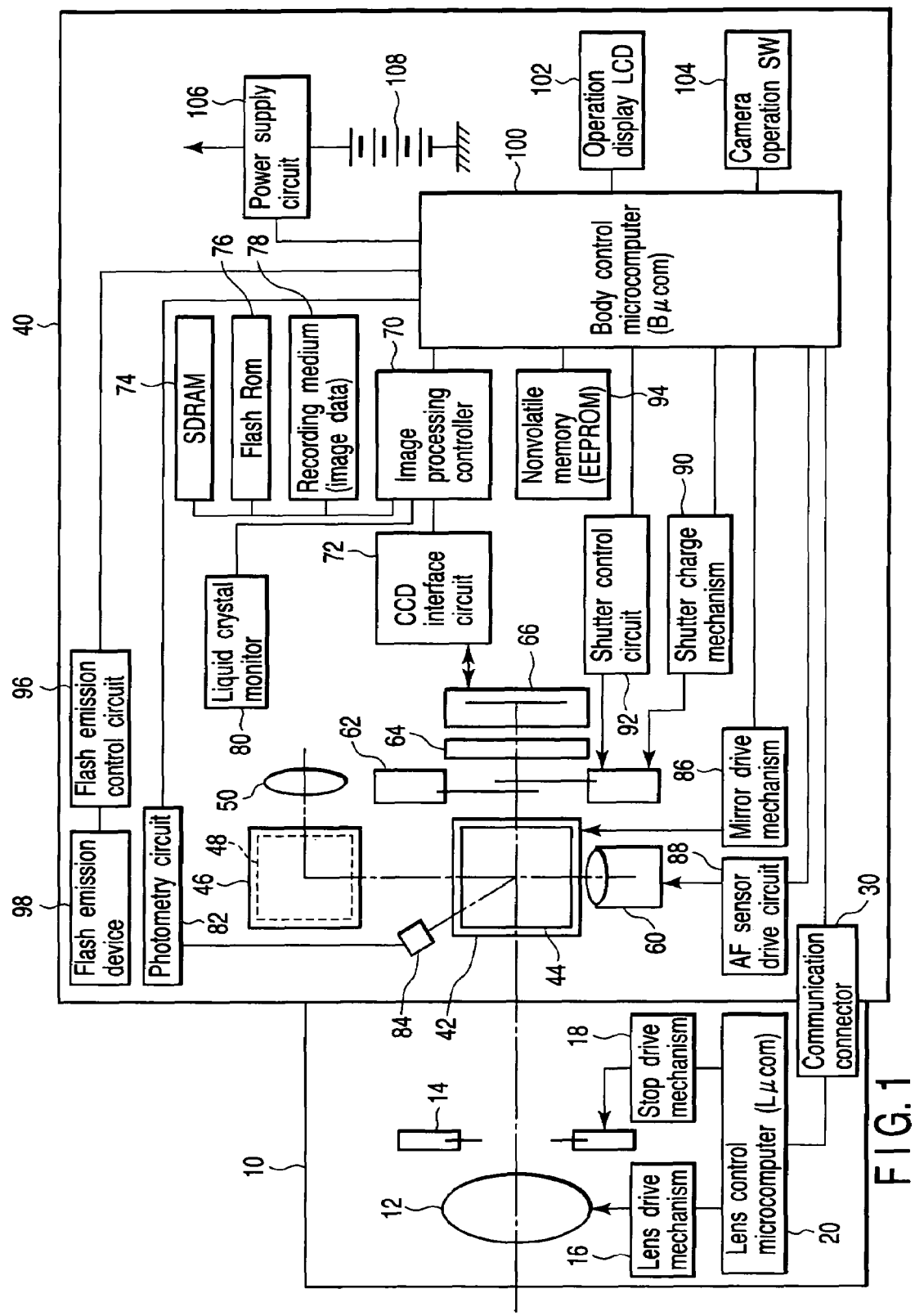
FIG. 1 is a block diagram showing the system arrangement of a camera according to the first embodiment of the present invention.

FIG. 1 is a block diagram showing the system arrangement of a camera according to the first embodiment of the present invention.

Referring to FIG. 1, this camera system mainly includes a lens unit 10 as an exchangeable lens, and a body unit 40 as a camera main body. A desired lens unit 10 is detachably set on the front surface of the body unit 40.

The lens unit 10 can be detachably mounted via a lens mount (not shown) provided to the front surface of the body unit 40. The lens unit 10 has a photographing lens 12, stop 14, lens drive mechanism 16, stop drive mechanism 18, and lens control microcomputer (to be abbreviated as Lµcom hereinafter) 20.

The photographing lens 12 is driven in the optical axis direction by a DC motor (not shown) included in the lens drive mechanism 16. The stop 14 is driven by a stepping motor (not shown) included in the stop drive mechanism 18. The Lµcom 20 controls driving of respective units in the lens unit 20 such as the lens drive mechanism 16, stop drive mechanism 18, and the like. This Lµcom 20 is electrically connected to a body control microcomputer 100 (to be described later) via a communication connector 30, and is controlled in accordance with instructions from the body control microcomputer 100.

On the other hand, the body unit 40 has the following arrangement.

A light beam from an object (not shown) which comes via the photographing lens 12 and stop 14 in the lens unit 10 is reflected by a quick return mirror 42 as a first mirror. The light beam reflected by the quick return mirror 42 reaches an eyepiece 50 of an eyepiece optical system via a viewfinder optical system (see FIGS. 2 and 3; to be described in detail later) including a second mirror 44, third mirror 46, fourth mirror 48, and the like. Some light components of the object light beam reflected by the quick return mirror 42 are further reflected by a half mirror 54 (to be described later), and are guided to an AF sensor unit 60 as a focal point position detection means used to perform automatic ranging.

A focal plane shutter 62, a transparent optical low-pass filter 64 which protects a CCD unit 66, and the CCD unit 66 as a photoelectric conversion element used to photoelectrically convert an object image transmitted through the optical system are arranged behind the quick return mirror 42. That is, when the quick return mirror 42 is retracted from the optical path, a light beam passing through the photographing lens 12 and stop 14 forms an image on the imaging surface of the CCD unit 66.

Note that the longitudinal direction of the CCD imaging range of the CCD unit 66 agrees with that of the camera (body unit 40) in the present embodiment. Also, the longitudinal direction of the photographing visual field range of the camera system agrees with that of the camera.

This body unit 40 has an image processing controller 70 used to perform image processes. To this image processing controller 70, a CCD interface circuit 72 connected to the CCD unit 66, an SDRAM 74, Flash ROM 76, and recording medium 78 provided as storage areas, a liquid crystal monitor 80, and the like are connected. These components are configured to provide a digital imaging function and digital recording/display function.

The recording medium 78 is an external recording medium such as various memory cards, an external hard disk drive (HDD), and the like, which are detachable from the body unit 40 via a camera interface (not shown).

The image processing controller 70 is connected to a body control microcomputer (to be abbreviated as Bµcom hereinafter) 100 which is connected to a photometry sensor 84 via a photometry circuit 82, a mirror drive mechanism 86, an AF sensor drive circuit 88, a shutter charge mechanism 90, a shutter control circuit 92, a nonvolatile memory (EEPROM) 94, a flash emission device 98 via a flash emission control circuit 96, and the like. This Bµcom 100 is used to control respective units in the body unit 40.

The Bµcom 100 is connected to an operation display LCD 102 used to notify a photographer of the operation state of the camera by visual outputs, a camera operation switch (SW) 104, and a battery 108 via a power supply circuit 106.

Note that the Bµcom 100 and Lµcom 20 are electrically connected via the communication connector 30 to be able to communicate with each other upon mounting the lens unit 10. The Lµcom 20 dependently operates as a digital camera in collaboration with the Bµcom 100.

The photometry circuit 82 executes a photometry process on the basis of an electrical signal from the photometry sensor 84. The mirror drive mechanism 86 controls driving of the quick return mirror 42, and the AF sensor drive circuit 88 controls driving of the AF sensor unit 60.

The shutter charge mechanism 90 charges springs used to drive front and rear curtains of the shutter 62. The shutter control circuit 92 controls the movements of the front and rear curtains of the shutter 92, and exchanges a signal for controlling the open/close operation of the shutter and a signal synchronized with a strobe with the Bµcom 100.

The nonvolatile memory 94 is a storage means that stores predetermined control parameters required for camera control as a storage area in addition to the aforementioned SDRAM 74, Flash ROM 76, and recording medium 78, and is accessible from the Bµcom 100.

The flash emission device 98 has a flash emission tube (not shown), and irradiates an object with flash light. The flash emission control circuit 96 performs the charge control required for light emission of the flash emission tube of the flash emission device 98 and the emission control of the flash emission device 98.

The operation display LCD 102 notifies the user of the camera operation state by visual outputs. The camera operation switch 104 serves as a switch means, and includes, e.g., a switch group including operation buttons required to operate the camera such as a release switch which is used to instruct execution of the photographing operation, and switches the quick return mirror 42 between the positions inside and outside the photographing optical path, a mode change switch used to switch a photographing mode and image display mode, a power switch and the like.

Furthermore, the power supply circuit 106 converts a voltage of the battery 108 as a power supply into a voltage required for the respective circuit units of the camera system, and supplies the converted voltage to the circuit units.

The aforementioned viewfinder optical system will be explained below with reference to FIGS. 2 and 3.

Figure 2:
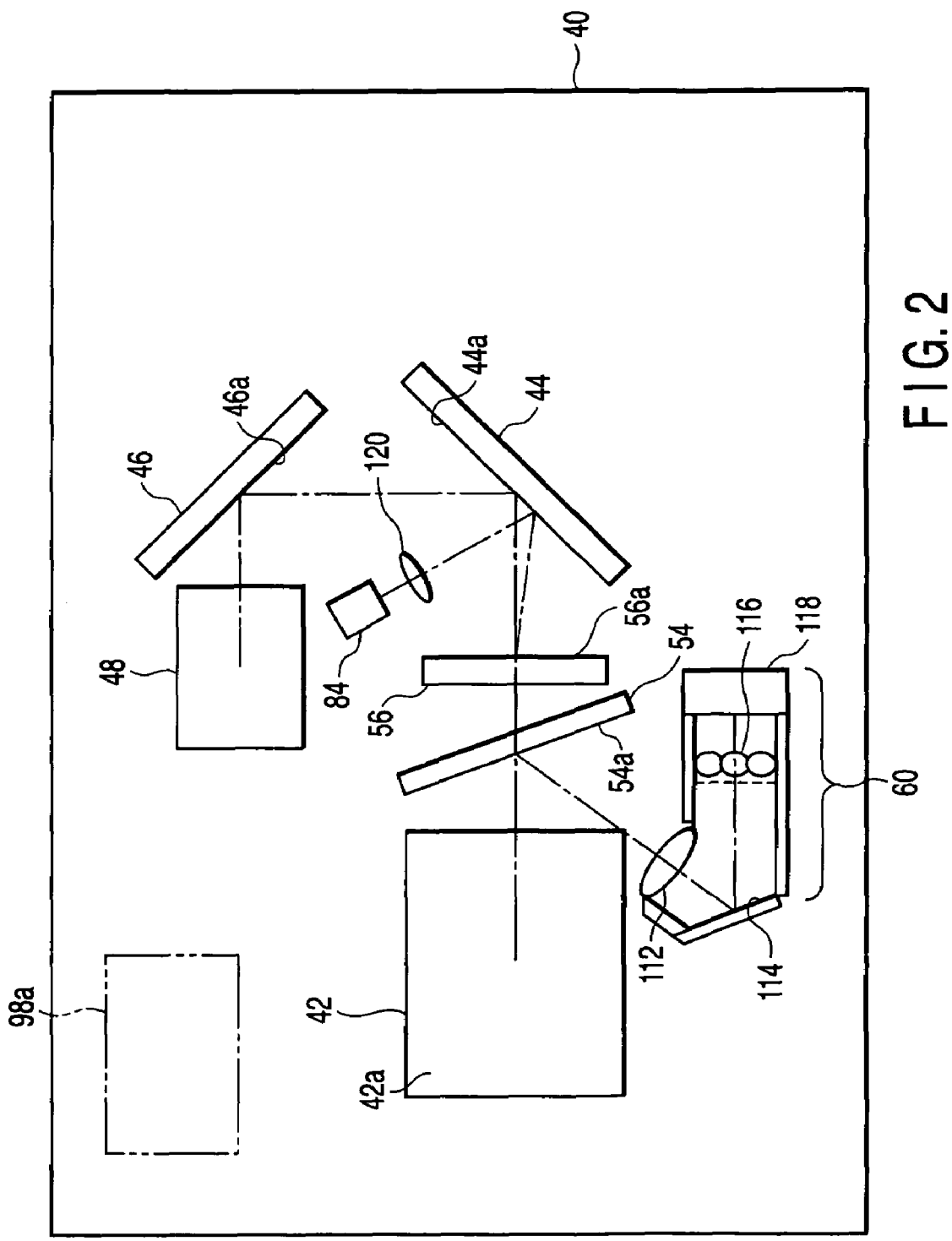
FIG. 2 is a front view from the photographing lens side, showing the layout in a viewfinder observation state in the first embodiment, i.e., a state wherein components of a viewfinder optical system and AF sensor unit are assembled in a camera body.
Figure 3:
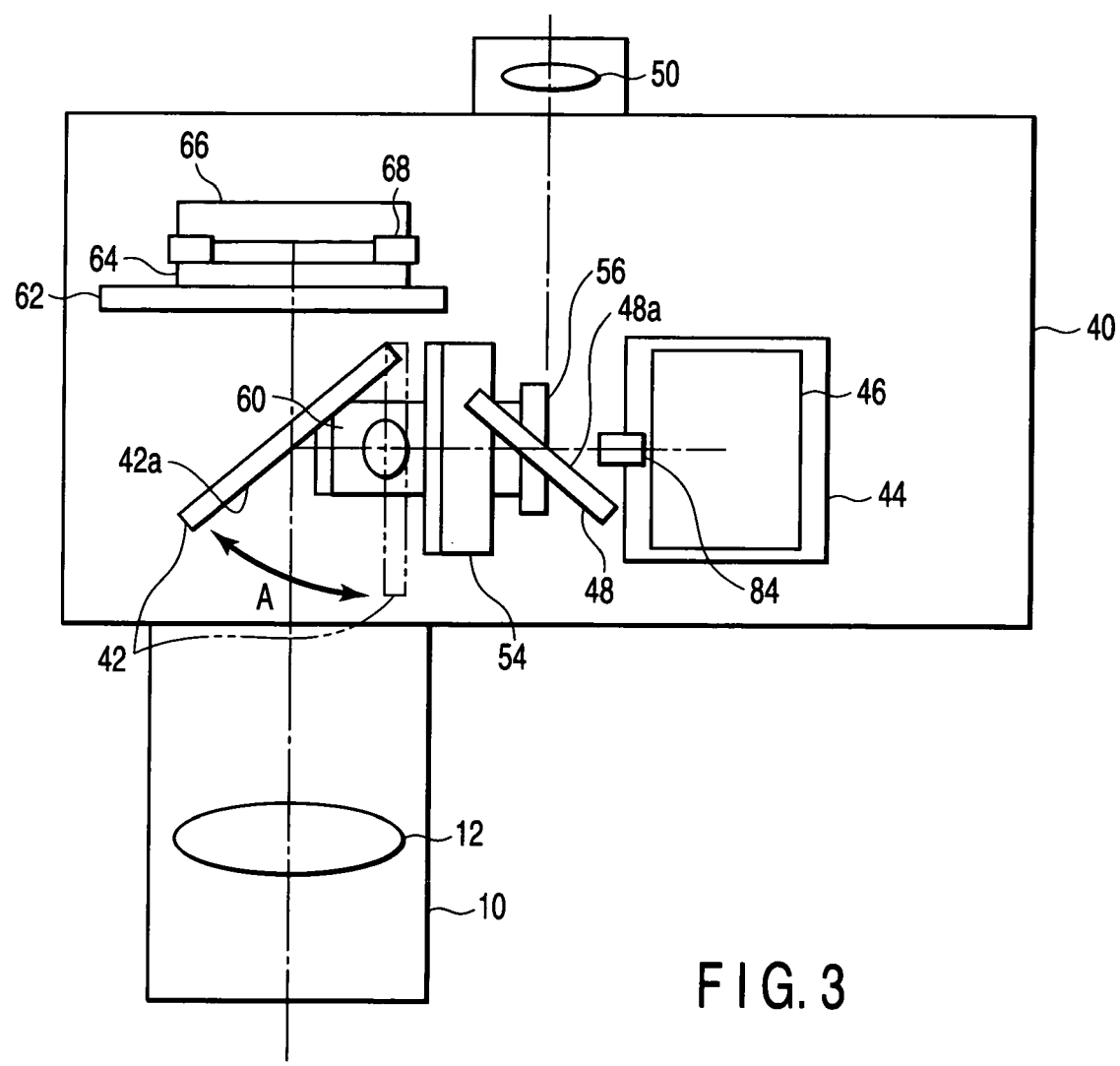
FIG. 3 is a view from the top surface side of the camera body, showing the layout in a viewfinder observation state in the first embodiment, i.e., a state wherein the components of the viewfinder optical system and AF sensor unit are assembled in the camera body.

FIGS. 2 and 3 show the layout in the viewfinder observation state in the first embodiment, i.e., in a state wherein components of the viewfinder optical system and AF sensor unit 60 are built in the camera body. FIG. 2 is a front view from the photographing lens side, and FIG. 3 is a view from the top surface side of the camera body.

In the following description, the camera state when the photographer holds the camera in a normal use state, i.e., in the longitudinal direction of the camera coincides with horizontal direction as shown in FIG. 2. Note that the longitudinal direction of the camera according to this embodiment coincides with the longitudinal directions of the visual field range and the imaging range.

This viewfinder optical system has a plurality of mirrors for guiding a light beam from an object which has passed through the photographing lens 12 in the lens unit 10 to the eyepiece 50, i.e., the quick return mirror 42 as a first mirror, second mirror 44, third mirror 46, and fourth mirror 48, half mirror 54, and screen 56.

The light beam from the object, which has passed through the photographing lens 12 reaches the quick return mirror 42 as a first reflection member which is pivotable in the direction of an arrow A in FIG. 3. In an object observation mode, the quick return mirror 42 is located between the photographing lens 12 and CCD unit 66, i.e., within the photographing optical path of the photographing lens 12, as indicated by the solid line in FIGS. 2 and 3. In an imaging mode, the quick return mirror 42 is moved to the position indicated by the two-dashed chain line in FIG. 3, i.e., is retracted from the photographing optical path by the mirror drive mechanism 86, so that the light beam from the object is guided to the CCD unit 66 via the shutter 62 and optical low-pass filter 64. Note that reference numeral 68 denotes a seal member used to provide a seal between the CCD unit 66 and optical low-pass filter 64.

In the object observation mode, an object light beam coming from the photographing lens 12 is reflected by a first reflection surface 42a of the quick return mirror 42 in a direction that makes an angle of about 90° with respect to the optical axis of the photographing lens and agrees with the longitudinal direction of the body unit 40. That is, the light beam is reflected rightward in FIG. 2.

The light beam reflected by the first reflection surface 42a of the quick return mirror 42 as the first reflection member enters the half mirror 54 which is arranged on the reflection optical axis of the first reflection surface 42a to make a predetermined tilt angle with the reflection optical axis. Some light components of the reflected light beam from the first reflection surface 42a are reflected toward the first reflection surface 42a side by this half mirror 54 in a direction which is different from the reflection optical axis of the first reflection surface 42a. That is, some light components of the reflected light beam from the first reflection surface 42a are reflected by the half mirror 54 in the left obliquely downward direction of the body unit 40 in FIG. 2. On the other hand, some other light components of the reflected light beam from the first reflection surface 42a are transmitted through the half mirror 54 and enter the second mirror 44 via the screen 56 (to be described later).

The second mirror 44, which is a second reflection member, is on a reflection optical axis from the first reflection surface 42a. The second mirror 44 has a second reflection surface 44a that is inclined by a predetermined angle with respect to the reflection optical axis from the first reflection surface 42a. The light beam having reflected from the first reflection surface 42a falls on the second mirror 44 and reflects at an angle of about 90° with respect to the reflection optical axis from the first reflection surface 42a. It then travels in a direction that is opposite to the reflection direction of the half mirror 54 with reference to the reflection optical axis from the first reflection surface 42a. That is, the reflected light beam from the first reflection surface 42a of the quick return mirror 42 is reflected by the second reflection surface 44a of the second mirror 44 in the upward direction of the body unit 40 in FIG. 2.

The third mirror 46, which is a third reflection member, is on a reflection optical axis from the second reflection surface 44a of the second mirror 44. The third mirror 46 has a third reflection surface 46a that is inclined by a predetermined angle with respect to the reflection optical axis from the second reflection surface 44a. The light beam having reflected from the second reflection surface 44a falls on the third mirror 46 and reflects by the third reflection surface 46a at an angle of about 90° with respect to the reflection optical axis from the second reflection surface 44a. It then travels in a direction that is parallel but opposite to the reflection direction of the first reflection surface 42a of the quick return mirror 42. That is, the reflected light beam from the second reflection surface 44a of the second mirror 44 is reflected by the third reflection surface 46a of the third mirror 46 in the leftward direction of the body unit 40 in FIG. 2. In other words, the light beam reflected by the first reflection surface 42a of the quick return mirror 42 is guided by the second and third mirrors 44 and 46 to turn back, and the reflection optical axis of the third reflection surface 46a of the third mirror 46 is substantially parallel to that of the first reflection surface 42a of the quick return mirror 42.

The fourth mirror 48, which is a fourth reflection member, is on a reflection optical axis from the third reflection surface 46a of the third mirror 46. The fourth mirror 48 has a fourth reflection surface 48a that is inclined by a predetermined angle with respect to the reflection optical axis from the third reflection surface 46a. The light beam having reflected from the third reflection surface 46a falls on the fourth mirror 48 and reflects by the fourth reflection surface 48a at an angle of about 90° with respect to the reflection optical axis from the third reflection surface 46a. It then travels in a direction that is almost the same as the light beam traveling direction from the photographing lens 12 to the quick return mirror 42. That is, reflected light beam from the third reflection surface 46a of the third mirror 46 is reflected by the fourth reflection surface 48a of the fourth mirror 48 upward in FIG. 3, i.e., the backward direction of the body unit 40. The reflection optical axis of the fourth reflection surface 48a is substantially parallel to the optical axis of the photographing lens 12.

The light beam reflected by the fourth reflection surface 48a of the fourth mirror 48 enters the eyepiece 50 which is arranged on the reflection optical axis of the fourth reflection surface 48a.

In this way, the object light beam from the photographing lens 12 is guided to the eyepiece 50 so that an image formed by that light beam is reversed by the first to fourth reflection surfaces 42a to 48a to obtain a correct image. In this way, the photographer can visually observe the object image formed on the screen 56.

In this embodiment, the quick return mirror 42, second mirror 44, third mirror 46, and fourth mirror 48 are arranged to reflect an incoming light beam through an angle of about 90°, as shown in FIGS. 2 and 3, but the present invention is not limited to such specific arrangement.

The half mirror 54 that forms an optical path splitting element is arranged on the reflection optical axis of the first reflection surface 42a to be closer to the first reflection surface 42a side, i.e., the quick return mirror 42 side than the screen 56. The half mirror 54 has an AF first reflection surface 54a, and some light beam components which are reflected by this surface 54a without being transmitted through it are guided to the AF sensor unit 60.

That is, the light beam reflected by the half mirror 54 as the AF first reflection surface 54a is reflected again by an AF second reflection surface 114 via a condenser lens 112. The light beam from the AF second reflection surface 114 is guided to an AF sensor 118 via a separator lens 116. The output from this AF sensor 118 is transmitted to the Bµcom 100 via the AF sensor drive circuit 88 to execute a known focus detection process.

The screen 56 has a surface for diffusing a light beam to make it easy to observe the focused state of the light beam that has entered the viewfinder optical system. The screen 56 is arranged at a position optically equivalent to the imaging surface of the CCD unit 66. The photographer can confirm a photographing frame by observing an image formed on this screen via the eyepiece 50.

The light beam reflected by the second reflection surface 44a of the second mirror 44 is focused by a photometry lens 120, and reaches the photometry sensor 84. In this way, the brightness of the object is measured by the photometry sensor 84.

Furthermore, a flash emission unit 98a that forms the flash emission device 98 is arranged in the front upper portion of the body unit 40. In this case, the flash emission unit 98a is located above the optical path of a light beam which comes from the photographing lens 12 and enters the quick return mirror 42.

The respective units of the digital camera with this arrangement operate as follows.

The image processing controller 70 controls the CCD interface circuit 72 in accordance with an instruction from the Bµcom 100 to capture image data from the CCD unit 66. This image data is converted into a video signal by the image processing controller 70, and is displayed on the liquid crystal monitor 80. The photographer can confirm a photographed image based on the image displayed on this liquid crystal monitor 80.

The image data is fetched by the SDRAM 74 as a temporary storage memory. This SDRAM 74 is used as a work area or the like upon converting the image data. This image data is saved in the recording medium 78 after it is converted into JPEG data.

The mirror drive mechanism 86 drives the quick return mirror 42 to a retracted position upon imaging and an observation position upon observation, as described above. When the quick return mirror 42 is located at the observation position by the mirror drive mechanism 86, a light beam from the photographing lens 12 is split and guided to the AF sensor unit 60 side and the second, third, fourth mirrors 44, 46, 48 side.

The output from the AF sensor 118 in the AF sensor unit 60 is transmitted to the Bµcom 100 via the AF sensor drive unit 88. In this manner, a known focus detection process is executed.

From the eyepiece 50 that neighbors the fourth mirror 48, the photographer can visually observe an object. Furthermore, some light components of the light beam focused on the screen 56 are reflected by the second mirror 44 and are guided to the photometry sensor 84. The photometry circuit 82 executes a known photometry process based on the amount of light detected by this sensor.

Upon reception of a shutter drive control signal from the Bµcom 100, the shutter control circuit 92 controls the shutter 64 based on that signal. At the same time, the shutter control circuit 92 outputs a flash emission sync signal requiring to control the flash emission device 98 to emit light to the Bµcom 100 at a predetermined timing. The Bµcom 100 outputs an emission instruction signal used to control the flash emission device 98 to emit light via the flash emission control circuit 96 on the basis of this flash emission sync signal.

The control operation to be executed by the Bµcom 100 of the aforementioned camera body unit 40 will be described below with reference to the flowchart shown in FIG. 4.

Figure 4:
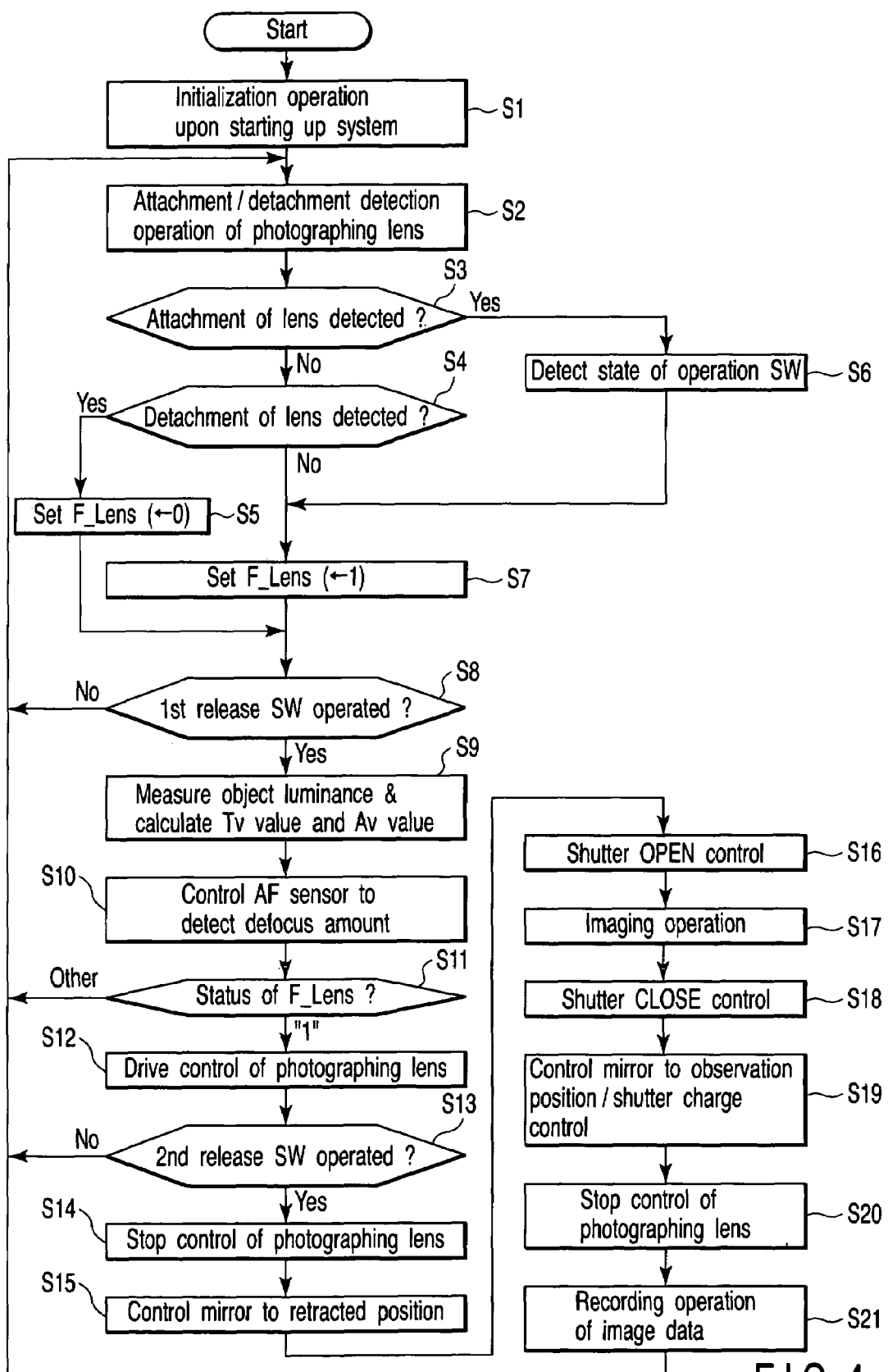
FIG. 4 is a flowchart for explaining the control operation executed by a Bµcom of the camera body.

FIG. 4 is a flowchart for explaining the operation of a control program which runs by the Bµcom 100.

When a power switch (not shown) in the camera operation switch 104 of the camera system is turned on, the operation of the Bµcom 100 starts. In step S1, a process for starting up the camera system is executed. In this case, the power supply circuit 106 is controlled to supply electric power to the respective circuit units that form this camera system, and the respective circuits are initialized.

Step S2 is executed periodically to make a communication operation with the Lµcom 20 so as to detect the state of the lens unit 10. It is checked in step S3 if the lens unit 10 is mounted on the body unit 40. If it is detected that the lens unit 10 is mounted, the flow advances to step S6; otherwise, the flow advances to step S4.

It is checked in step S4 if the lens unit 10 is detached from the body unit 40. If it is detected that the lens unit 10 is detached from the body unit 40, the flow advances to step S5. In step S5, a control flag F_Lens is reset to "0", and the flow then advances to step S8. On the other hand, if it is not detected in step S4 that the lens unit 10 is detached from the body unit 40, the flow advances to step S7.

In step S7, the control flag F_Lens is set to "1". This control flag indicates "1" while the lens unit 10 is mounted on the body unit 40 of the camera system, and "0" while the lens unit 10 is detached.

In step S6 above, the state of the camera operation switch 104 is detected. Various modes are set in accordance with the state of the camera operation switch 104.

It is checked in step S8 if a first release switch (not shown) as one of the camera operation switch 104 is operated. If the first release switch is ON, the flow advances to step S9; if it is OFF, the flow returns to step S2.

In step S9, luminance information of an object is acquired from the photometry circuit 82. Based on this information, an exposure time (Tv value) of the CCD unit 66 and a stop setting value (Av value) of the photographing lens 12 are calculated. In step S10, detection data of the AF sensor unit 60 is acquired via the AF sensor drive circuit 88. Based on this data, a defocus amount is calculated.

In step S11, the status of the control flag F_Lens is checked. If the control flag F_Lens is "0", this means that no lens unit 10 is mounted, the photographing operation in step S12 and subsequent steps cannot be executed. In this case, the flow returns to step S2. On the other hand, if the control flag F_Lens is "1", the flow advances to step S12. In step S12, the defocus amount is transmitted to the Lµcom 20 via the communication connector 30 and a drive instruction of the photographing lens 12 is issued based on this defocus amount.

It is checked in step S13 if a second release switch (not shown) as one of the camera operation switch 104 is operated. If the second release switch is ON, the flow advances to step S14 to execute a predetermined photographing operation; if it is OFF, the flow returns to step S2.

In step S14, the Av value is transmitted to the Lµcom 20 to issue a drive instruction of the stop 14. In step S15, the quick return mirror 42 pivots in the direction of the arrow A in FIG. 3 to the retracted position indicated by the two-dashed chain line in FIG. 3.

Furthermore, the front curtain of the shutter 62 begins to travel in step S16, and an imaging operation execution instruction is issued to the image processing controller 70 in step S17. Upon completion of exposure to the CCD unit 66 for a time period indicated by the Tv value, the rear curtain of the shutter 62 begins to travel in step S18.

In step S19, the quick return mirror 42 is driven to the observation position indicated by the solid line in FIG. 3. At the same time, the shutter charge mechanism 90 performs a charge operation of the shutter 62.

In step S20, an instruction for returning the stop 14 to the open position is issued to the Lµcom 20. In step S21, a recording instruction of the photographed image data on the recording medium 78 is issued to the image processing controller 70. Upon completion of recording of that image data, the flow returns to step S2.

As described above, according to the first embodiment, since the viewfinder optical system that receives a light beam reflected by the quick return mirror is arranged in the longitudinal direction of the camera body, the height of the camera body can be reduced.

In a conventional system, a quick return mirror is formed to have a half mirror in only a central portion, and a focus detect light beam is guided to an AF sensor unit via a sub mirror. In this system, since the sub mirror is arranged between the quick return mirror and a shutter, a large sub mirror cannot be adopted to prevent physical interference between the shutter and sub mirror. Therefore, only a photographing light beam near the central portion in the photographing range is guided to the AF sensor unit.

By contrast, according to this embodiment, the half mirror as an optical path splitting element that guides a focus detect light beam is arranged after a light beam coming from the photographing lens is reflected by the quick return mirror. As a result, the half mirror size can be easily increased, and for example, a light range in nearly the full photographing range can be guided to the AF sensor unit.

In this way, according to the first embodiment, since a focus detect light beam is guided using the full surfaces of the quick return mirror and half mirror, the visual field range that can undergo focus detection can be easily broadened.

Furthermore, in this embodiment, the viewfinder optical system is constituted by the half mirror 54, screen 56, and four mirrors, i.e., the quick return mirror 42, second mirror 44, third mirror 46, and fourth mirror 48. However, the present invention is not limited to this.

SECOND EMBODIMENT

The second embodiment of the present invention will be described hereinafter.

Figure 5:
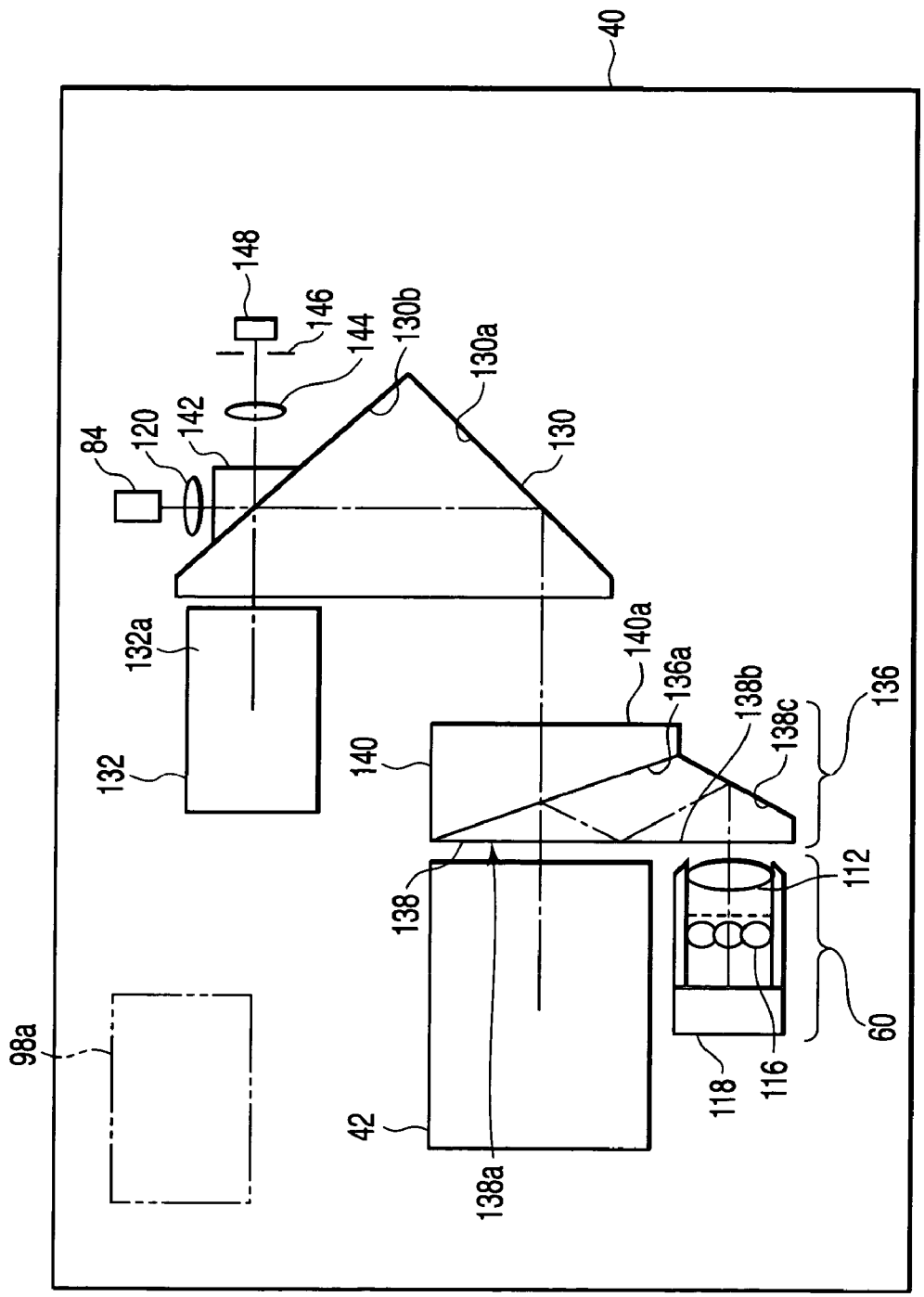
FIG. 5 is a front view from the photographing lens side, showing the layout in a viewfinder observation state in the second embodiment, i.e., a state wherein components of a viewfinder optical system and AF sensor unit are assembled in a camera body.
Figure 6:
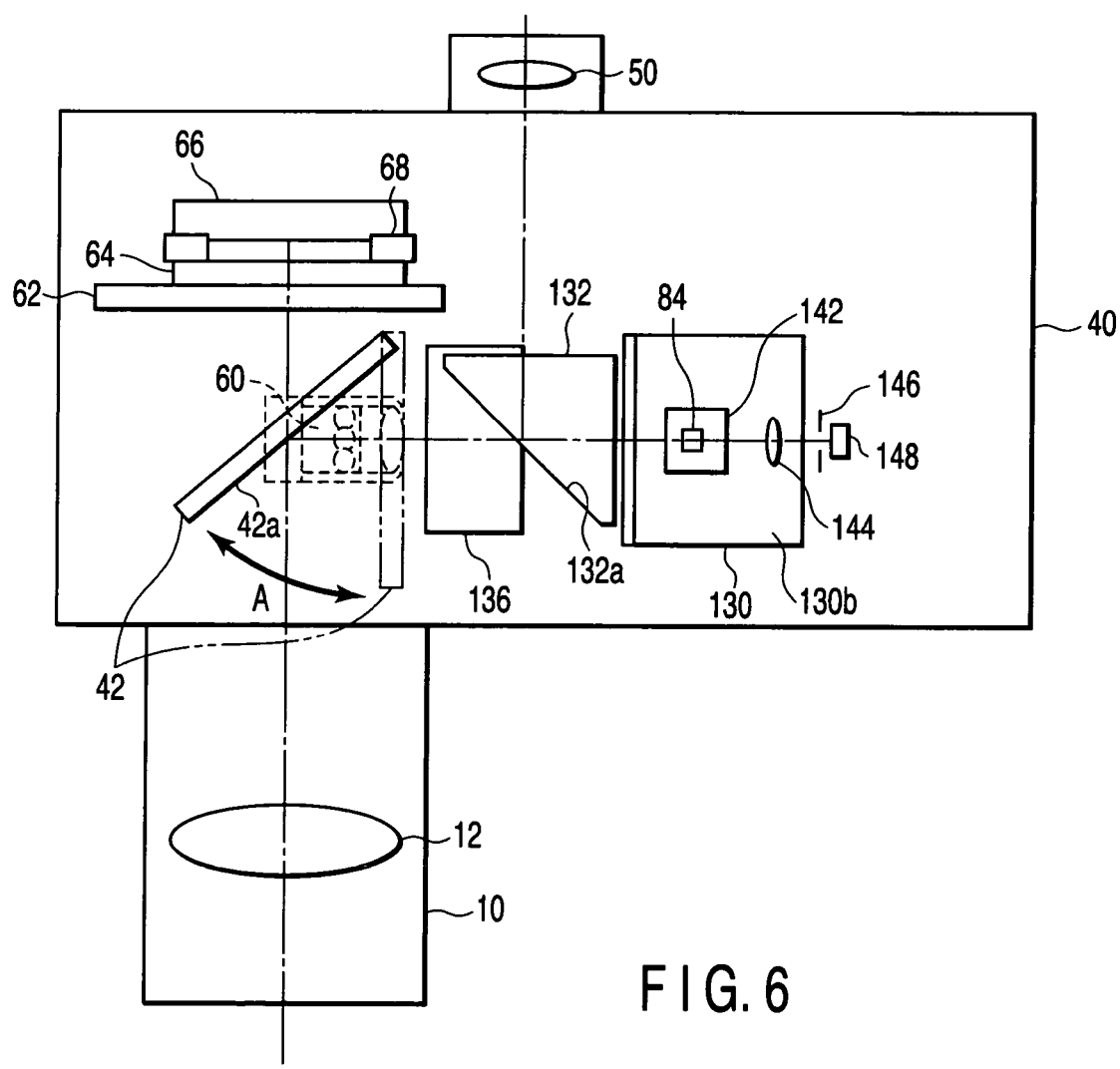
FIG. 6 is a view from the top surface side of the camera body, showing the layout in a viewfinder observation state in the second embodiment, i.e., a state wherein the components of the viewfinder optical system and AF sensor unit are assembled in the camera body.

FIGS. 5 and 6 show the layout in the viewfinder observation state in the second embodiment, i.e., in a state wherein components of the viewfinder optical system and AF sensor unit 60 are built in the camera body. FIG. 5 is a front view from the photographing lens side, and FIG. 6 is a view from the top surface side of the camera body.

In the aforementioned first embodiment, the viewfinder optical system comprises the quick return mirror 42, second to fourth mirrors 44 to 48, half mirror 54, and screen 56. However, in this second embodiment, the viewfinder optical system comprises two prisms and an AF beam splitter except for the quick return mirror 42.

Note that the reflection directions of the first to fourth reflection surfaces, which guide an object light beam from the photographing lens 12 to the eyepiece 50 are the same as those in the first embodiment described above.

The second embodiment will be described below. In the embodiment to be described below, the arrangement except for the viewfinder optical system is the same as that of the camera system of the first embodiment shown in FIG. 1, and the basic photographing operation is the same as that in the flowchart of FIG. 4 of the first embodiment described above. Therefore, as for these arrangement and operation, the same reference numerals denote the same parts and an illustration and description thereof will be omitted.

As shown in FIGS. 5 and 6, a light beam from an object that has passed through the photographing lens 12 reaches the quick return mirror 42 which is pivotable in the direction of an arrow A in FIG. 6. In the object observation mode, the light beam from the object, which is reflected rightward in FIG. 5 by the first reflection surface 42a of the quick return mirror 42, is transmitted through a beam splitter 136 as an optical path splitting element, except for some light components, and is reflected again by a second reflection surface 130a of a first prism 130 in the upward direction in FIG. 5. The light beam reflected by the second reflection surface 130a of the first prism 130 is reflected by a third reflection surface 130b of the first prism 130 in the leftward direction in FIG. 5. Furthermore, the light beam reflected by the third reflection surface 130b of the first prism 130 is reflected by a fourth reflection surface 132a of a second prism 132 in the direction of the eyepiece 50. In this manner, the photographer can visually observe an object via the eyepiece 50.

In this embodiment, the quick return mirror 42, the second and third reflection surfaces 130a and 130b of the first prism 130, and the fourth reflection surface 132a of the second prism 132 are arranged to reflect an incoming light beam through an angle of about 90°, as shown in FIGS. 5 and 6, but the present invention is not limited to such specific arrangement.

The beam splitter 136 is formed by laminating AF first and second prisms 138 and 140. The beam splitter 136 is arranged so that an entrance/exit surface 138a formed on the AF first prism 138 and a screen surface 140a formed on the AF second prism 140 become perpendicular to the reflection optical axis from the first reflection surface 42a. The beam splitter 136 has a half mirror 136a on the laminated surface of the AF first and second prisms 138 and 140.

The reflected light from the first reflection surface 42a enters the beam splitter 138 from the entrance/exit surface 138a formed on the AF first prism 138. A light beam which is not transmitted through but is reflected by the half mirror 136a as an AF first reflection surface is reflected toward the entrance/exit surface 138a in a direction which is different from the reflection optical axis direction of the first reflection surface 42a of the quick return mirror 42.

The reflected light from the half mirror 136a is reflected toward an AF third reflection surface 138c by an AF second reflection surface 138b which is flush with the entrance/exit surface 138a. Since the AF second reflection surface 138b is formed on the entrance/exit surface 138a, the reflected light from the half mirror 136a enters the AF second reflection surface 138b at an angle that causes total reflection by the AF second reflection surface 138b.

The reflected light from the AF second reflection surface 138b is reflected by the AF third reflection surface 138c in a direction which is substantially parallel to the reflection optical axis direction of the first reflection surface 42a of the quick return mirror 42 and is opposite to the reflection direction of the first reflection surface 42a, and exits the beam splitter 136 via the entrance/exit surface 138a.

In this manner, of the reflected light from the first reflection surface 42a of the quick return mirror 42, a light beam reflected by the half mirror 136a is reflected by the half mirror 136a and AF second reflection surface 138b in a direction away from the reflection optical axis of the first reflection surface 42a of the quick return mirror 42. Then, the light beam is reflected by the AF third reflection surface 138c in a direction substantially parallel to the reflection direction of the first reflection surface 42a of the quick return mirror 42 and is guided to the AF sensor unit 60. In this case, the incoming light beam to the AF sensor unit 60 is guided to the AF sensor 118 via the condenser lens 112 and separator lens 116.

The AF second prism 140 has the screen surface (primary imaging surface) 140a which images a light beam that enters the viewfinder optical system as an optical image. This screen surface 140a is arranged at a position optically equivalent to the imaging surface of the CCD unit 66, and its surface is a diffusing surface. The photographer can confirm a photographing frame by observing an image formed on this screen surface 140a via the eyepiece 50.

On the other hand, a photometry/display prism 142 is laminated at a position opposite to the third reflection surface 130b of the first prism 130. A light beam reflected by the second reflection surface 130a of the first prism 130 is reflected by the third reflection surface 130b except for its some light components. Some light beam components which are not reflected by the third reflection surface 130b are transmitted through the photometry/display prism 142, are focused by the photometry lens 120, and reach the photometry sensor 84. As a result, the photometry sensor 84 measures the brightness of an object.

In this embodiment, the screen surface is integrated with the AF second prism 140. However, an independent screen may be used as in the aforementioned first embodiment. As the beam splitter 136, those with various other shapes may be used in addition to that of this embodiment. For example, a light beam is reflected three times by the half mirror 136a and the AF second and third reflection surfaces 138b and 138c, and is then guided to the AF sensor unit 60. However, the present invention is not limited to such specific arrangement. That is, a light beam may be guided to the AF sensor unit 60 by single reflection by the half mirror 136*a* or double reflection by the half mirror 136*a* and AF second reflection surface 138*b*. The number of reflections in the beam splitter is not particularly limited.

Furthermore, a display mask 146 is arranged near the photometry/display prism 142 and at a position that is optically equivalent to the position of the screen surface 140*a*. A display lens 144 and display LED 148 are arranged, opposing each other across the display mask 146. The photographer can visually observe, via the eyepiece 50, various kinds of information of AF, AE, and the like, which are displayed on this display LED 148, since they are transmitted through the photometry prism 142 and the third reflection surface 130*b* of the first prism 130 via the display mask 146 and display lens 144, and are reflected by the fourth reflection surface 132*a* of the second prism 132. In this manner, various kinds of information are superimposed in the viewfinder via the eyepiece 50.

In the second embodiment, the beam splitter 136 can be used as an optical path splitting element. The light-emersion surface of the beam splitter 136 is utilized as diffusing surface, thus providing a screen surface. This helps to reduce the number of components.

As indicated above, two prisms provides the second to fourth reflection surfaces. Instead, a reflector and a prism may be combined to provide these reflection surfaces. If only prisms are used to provide the reflection surfaces, they are not limited to those utilized in the present embodiment. For example, three prisms may be used to provide the second, third and fourth reflection surfaces, respectively. Alternatively, a prism having the second reflection surface and a prism having the third and fourth reflection surfaces may be used.

THIRD EMBODIMENT

The third embodiment of the present invention will be described hereinafter.

In the third embodiment, the half mirror 54 is provided for the AF sensor unit 60. If this half mirror is pivotablely arranged, the camera body can become further compact in the widthwise direction in FIG. 2.

Figure 7:
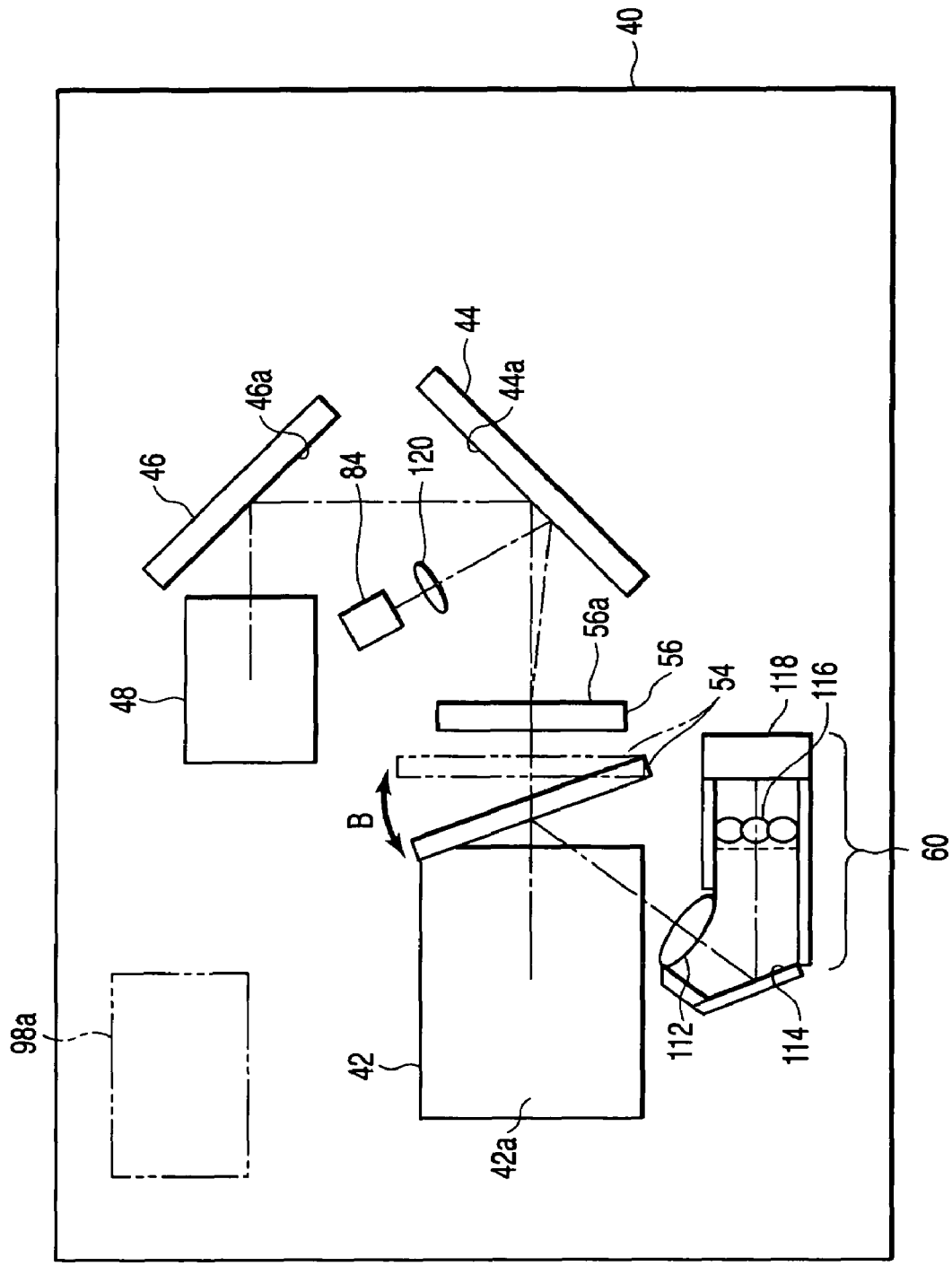
FIG. 7 is a front view from the photographing lens side, showing the layout in a viewfinder observation state in the third embodiment, i.e., a state wherein components of a viewfinder optical system and AF sensor unit are assembled in a camera body.
Figure 8:
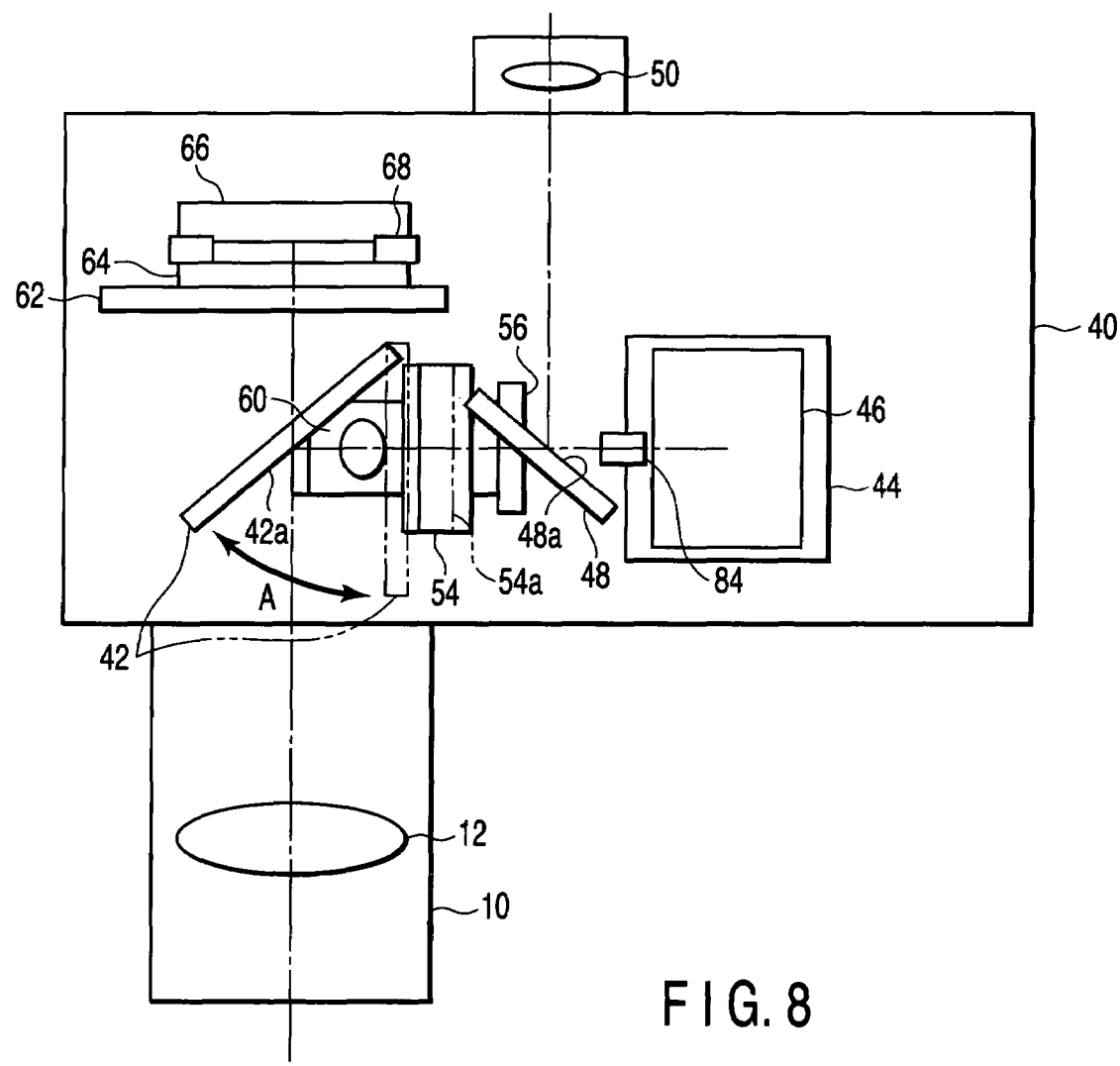
FIG. 8 is a view from the top surface side of the camera body, showing the layout in a viewfinder observation state in the third embodiment, i.e., a state wherein the components of the viewfinder optical system and AF sensor unit are assembled in the camera body.

FIGS. 7 and 8 show the layout in the viewfinder observation state in the third embodiment, i.e., in a state wherein components of the viewfinder optical system and AF sensor unit 60 are built in the camera body. FIG. 7 is a front view from the photographing lens side, and FIG. 8 is a view from the top surface side of the camera body.

In this viewfinder optical system, a light beam from an object that has passed through the photographing lens 12 reaches the quick return mirror (first reflection surface) 42 which is pivotable in the direction of an arrow A in FIG. 8. In the object observation mode, the light beam from the object, which is reflected in the rightward direction in FIG. 8 by the quick return mirror 42, is transmitted through the half mirror 54 except for its some light components, and is guided to the screen 56.

Note that the half mirror 54 is pivotable in the direction of an arrow B in FIG. 7. In the object observation mode, the half mirror 54 is located at a position indicated by the solid line in FIGS. 7 and 8. In the imaging mode, the half mirror 54 is retracted from the photographing optical path to a position indicated by the two-dashed chain line in FIG. 7 as in the quick return mirror 42. At this time, the quick return mirror 42 is also moved to a position indicated by the two-dashed chain line in FIG. 8.

That is, the half mirror 54 as an optical path splitting element is movably arranged between a position at which it can reflect the reflected light beam from the first reflection surface 42*a* of the quick return mirror 42 toward the AF sensor unit 60, and a position at which it cannot reflect it.

Note that the arrangement except for that of the half mirror 54 is basically the same as the aforementioned first embodiment shown in FIGS. 1 to 4. Hence, as for these arrangement and operation, the same reference numerals denote the same parts and an illustration and description thereof will be omitted.

In this way, since the half mirror 54 is pivotablely arranged to be retracted from the photographing optical path in the imaging mode, the distance from the photographing optical path to the half mirror 54 can be shortened. As a result, the screen 56, second mirror 44, third mirror 46, fourth mirror 48, and the like can be arranged at positions closer to the photographing optical path than in the first embodiment. Therefore, the size of the body unit 40 in the widthwise direction can be reduced in FIGS. 7 and 8.

In the first to third embodiments described above, the first to fourth mirrors or first and second prisms are used in the viewfinder optical system, and the half mirror, beam splitter, and the like are used for AF. However, the present invention is not limited to the aforementioned arrangements, and for example, mirrors and a beam splitter may be combined.

In this way, a compact camera which allows an efficient space layout of the viewfinder optical system and automatic focus detection optical system and can reduce the height can be provided.

FOURTH EMBODIMENT

The fourth embodiment of the present invention will be described hereinafter.

In the aforementioned first to third embodiments, the layout of members other than the flash emission unit 98*a* of the flash emission device 98, e.g., the control circuit and capacitor, is not specified. In the fourth embodiment, the control circuit and capacitor which form the flash emission device 98 are arranged on the back surface side of the second mirror 44.

Figure 9:
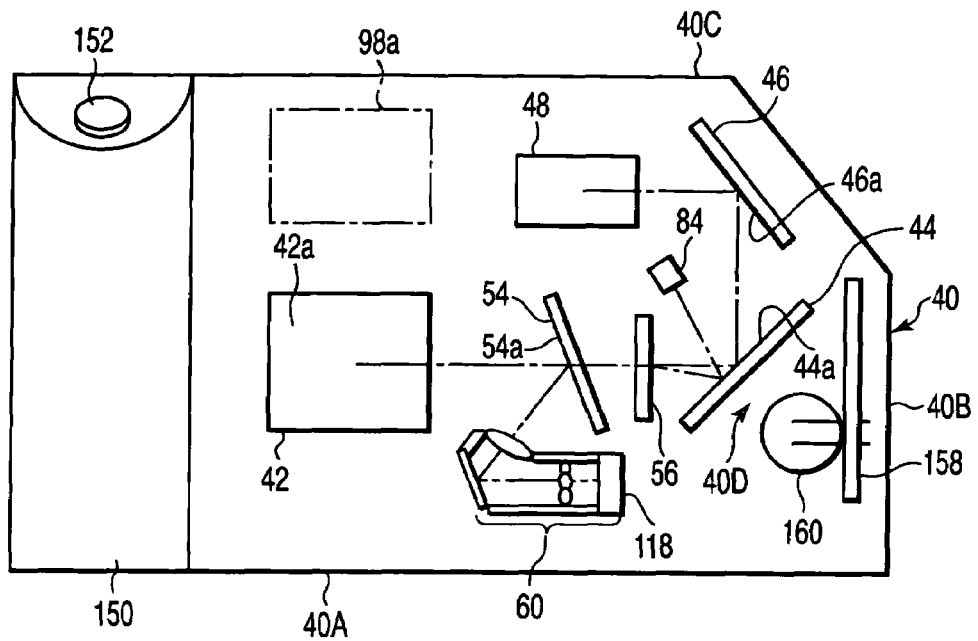
FIG. 9 is a front view from the photographing lens side, showing the layout in a viewfinder observation state in the fourth embodiment, i.e., a state wherein components of a viewfinder optical system and flash emission device are assembled in a camera body.
Figure 10:
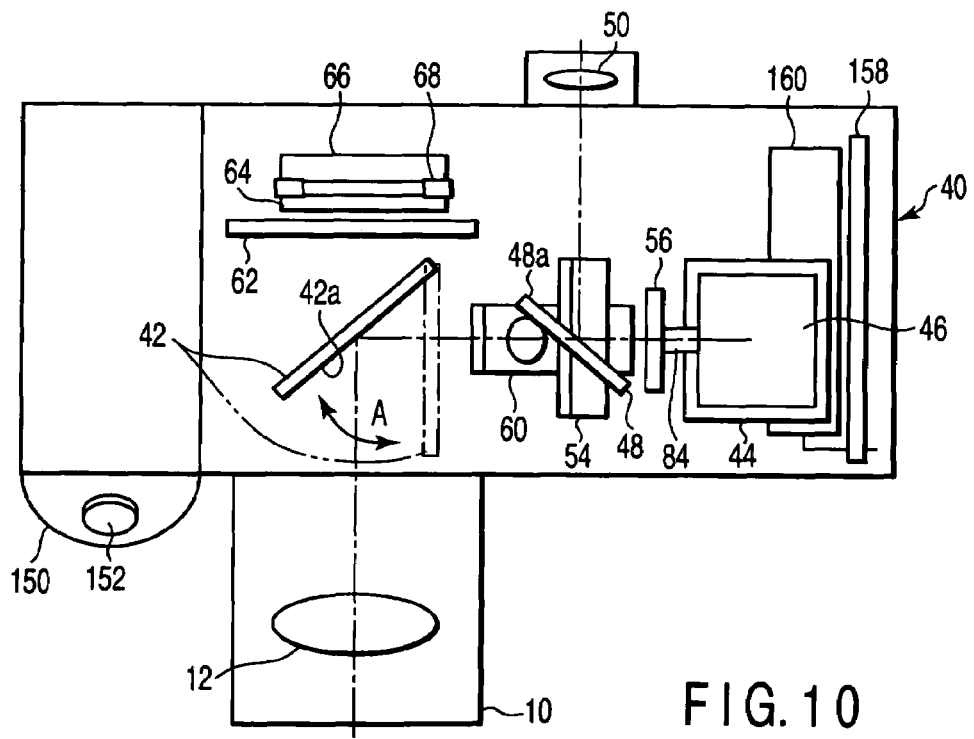
FIG. 10 is a view from the top surface side of the camera body, showing the layout in a viewfinder observation state in the fourth embodiment, i.e., a state wherein the components of the viewfinder optical system and flash emission device are assembled in the camera body.

FIGS. 9 and 10 show the layout in the viewfinder observation state in the fourth embodiment, i.e., in a state wherein components of the viewfinder optical system and flash emission device are built in the camera body. FIG. 9 is a front view from the photographing lens side, and FIG. 10 is a view from the top surface side of the camera body.

On the right side of the body unit 40 of this camera system (on the left side in FIGS. 9 and 10), a grip 150 that allows the photographer to easily hold the camera is formed. A release button 152 corresponding to the release switch of the camera operation switch 104 is provided on the top surface portion of this grip 150.

The camera body 40 is covered by an exterior member while various building units are arranged in it. That is, the side surfaces of the camera body 40 are covered by a first side surface 40A, second side surface 40B, and third side surface 40C formed of one or a plurality of exterior members.

This first side surface 40A is formed to be roughly perpendicular to a side surface on the side where the grip 150 as a gripping portion of the camera body 40 is formed. The second side surface 40B is formed to be roughly perpendicular to the first side surface 40A, and to roughly face the side surface of the camera body 40 on the side where the grip 150 is formed. Furthermore, the third side surface 40C is formed to be roughly perpendicular to the second side surface 40 and to roughly face the first side surface 40A.

In other words, the first side surface 40A forms the bottom surface of the camera body 40, the second side surface 40B forms the right side surface when the camera body 40 is viewed from the photographing lens side, and the third side surface 40C forms the top surface of the camera body 40.

The viewfinder optical system has a plurality of mirrors for guiding a light beam from an object which has passed through the photographing lens 12 in the lens unit 10 to the eyepiece 50, i.e., the quick return mirror 42 as a first mirror, second mirror 44, third mirror 46, and fourth mirror 48, half mirror 54, and screen 56.

In the object observation mode, an object light beam coming from the photographing lens 12 is reflected by the first reflection surface 42a of the quick return mirror 42 in a direction which makes an angle of about 90° with the optical axis of the photographing lens 12 and agrees with the longitudinal direction of the body unit 40. That is, the light beam is reflected in the rightward direction in FIG. 9. In other words, the object light beam having reflected from the quick return mirror 42 travels in a direction that is substantially parallel to the first side surface 40A and agrees with the direction directing the second side surface 40B.

The light beam reflected by the first reflection surface 42a of the quick return mirror 42 enters the half mirror 54. Some light components of the reflected light beam from the quick return mirror 42 are reflected by the half mirror 54 in the left obliquely downward direction of the body unit 40 in FIG. 9. On the other hand, some other light components of the reflected light beam from the quick return mirror 42 are transmitted through the half mirror 54 and enter the second mirror 44 via the screen 56.

The reflected light beam from the quick return mirror 42, which has entered the second mirror 44, is reflected by the second reflection surface 44a of the second mirror 44 in the upward direction of the body unit 40 in FIG. 9. In other words, the reflected light beam from the quick return mirror 42 is reflected by the second mirror 44 in a direction toward the third side surface 40C.

The light beam reflected by the second reflection surface 44a of the second mirror 44 enters the third mirror 46 whose third reflection surface 46a as its reflection surface is arranged on the reflection optical axis of the second reflection surface 44a to make a predetermined tilt angle with the reflection optical axis of the second reflection surface 44a.

The reflected light beam from the second reflection surface 44a that has entered the third mirror 46 as the third reflection mirror 46a is reflected by the third reflection surface 46a of the third mirror 46 in the leftward direction of the body unit 40 in FIG. 9. In other words, the light beam reflected by the first reflection surface 42a of the quick return mirror 42 is guided by the second and third mirrors 44 and 46 to turn back, and the reflection optical axis of the third reflection surface 46a of the third mirror 46 is substantially parallel to that of the first reflection surface 42a of the quick return mirror 42. As a result, the light beam reflected by the first reflection surface 42a travels toward the grip 150 side.

The light beam reflected by the third reflection surface 46a of the third mirror 46 enters the fourth mirror 48 whose fourth reflection surface 48a as its reflection surface is arranged on the reflection optical axis of the third reflection surface 46a to make a predetermined tilt angle with the reflection optical axis of the third reflection surface 46a of the third mirror 46.

The reflected light beam from the third reflection surface 46a that has entered the fourth mirror 48 as the fourth reflection surface 48a is reflected by the fourth reflection surface 48a of the fourth mirror 48 in a direction which makes an angle of about 90° with the reflection optical axis from the third reflection surface 46a. That is, the reflected light beam from the third reflection surface 46a of the third mirror 46 enters the eyepiece 50 which is arranged on the reflection optical axis of the fourth reflection surface 48a.

In this way, the object light beam from the photographing lens 12 is guided to the eyepiece 50 so that an image formed by that light beam is reversed by the first to fourth reflection surfaces 42a to 48a to obtain a correct image. In this way, the photographer can visually observe the object image formed on the screen 56.

In this embodiment, the quick return mirror 42, second mirror 44, third mirror 46, and fourth mirror 48 are arranged to reflect an incoming light beam through an angle of about 90°, as shown in FIGS. 9 and 10, but the present invention is not limited to such specific arrangement.

The half mirror 54 that forms an optical path splitting element is arranged on the reflection optical axis of the first reflection surface 42a to be closer to the first reflection surface 42a side, i.e., the quick return mirror 42 side than the screen 56. The half mirror 54 has a first reflection surface for AF, and some light beam components which are reflected by this surface 54a without being transmitted through it are guided to the AF sensor unit 60. The output from the AF sensor 118 in this AF sensor unit 60 is transmitted to the Bµcom 100 via the AF sensor drive circuit 88, thus executing a known focus detection process.

The screen 56 has a surface for diffusing a light beam to make it easy to observe the focused state of the light beam that has entered the viewfinder optical system. The screen 56 is arranged at a position optically equivalent to the imaging surface of the CCD unit 66. The photographer can confirm a photographing frame by observing an image formed on this screen 56 via the eyepiece 50.

The light beam reflected by the second reflection surface 44a of the aforementioned second mirror 44 reaches the photometry sensor 84. In this way, the brightness of the object is measured by the photometry sensor 84.

The flash emission unit 98a that forms the flash emission device 98 is arranged in the front upper portion of the body unit 40. In this case, the flash emission unit 98a is located above the optical path of a light beam which comes from the photographing lens 12 and enters the quick return mirror 42.

A capacitor 160 for the flash emission device, which serves as a (first) charge accumulation member that forms the flash emission device 98, is arranged on the side opposite to (on the back surface side of) the second reflection surface 44a of the second mirror 44. That is, the capacitor 160 for the flash emission device is arranged in a first triangular region 40D bounded by the second mirror 44, and the first and second side surfaces 40A and 40B. This capacitor 160 for the flash emission device is mounted on and connected to a control board 158 for the flash emission device via a lead wire and the like.

Electronic parts (not shown) which form a control circuit for the flash emission device are mounted on the control board 158 for the flash emission device. The control board 158 for the flash emission device on which the capacitor 160 for the flash emission device is mounted is arranged on the back surface side of the second mirror 44 to be substantially parallel to the second side surface 40B, and is attached to a main body member (not shown) in the body unit 40.

Note that the capacitor 160 for the flash emission device has nearly a columnar shape, and it has a cylindrical shape in this embodiment. The capacitor 160 for the flash emission device is arranged so that its longitudinal direction becomes nearly parallel to the optical axis of the lens unit 10.

Note that the arrangement other than those of the control board 158 and capacitor 160 for the flash emission device is the same as that of the first to third embodiments shown in FIGS. 1 to 8. As for these arrangement and operation, the same reference numerals denote the same parts and an illustration and description thereof will be omitted.

As described above, according to the fourth embodiment, since the capacitor 160 for the flash emission device, which is arranged in the grip 150 in the conventional system, is arranged on the back surface side of the second mirror 44 of the viewfinder optical system, the size of the grip 150 can be reduced, and the height of the camera body can also be decreased. Furthermore, as the volume of the camera body is decreased, the weight of the camera can be reduced.

Also, since a focus detect light beam is guided using the full surfaces of the quick return mirror 42 and half mirror 54, the visual field range that can undergo focus detecting can be easily broadened.

In this embodiment, the viewfinder optical system comprises the half mirror 54, screen 56, and four mirrors, i.e., the quick return mirror 42, second mirror 44, third mirror 46, and fourth mirror 48. However, the present invention is not limited to this.

A modification of the fourth embodiment will be explained below with reference to FIGS. 11 and 12.

Figure 11:
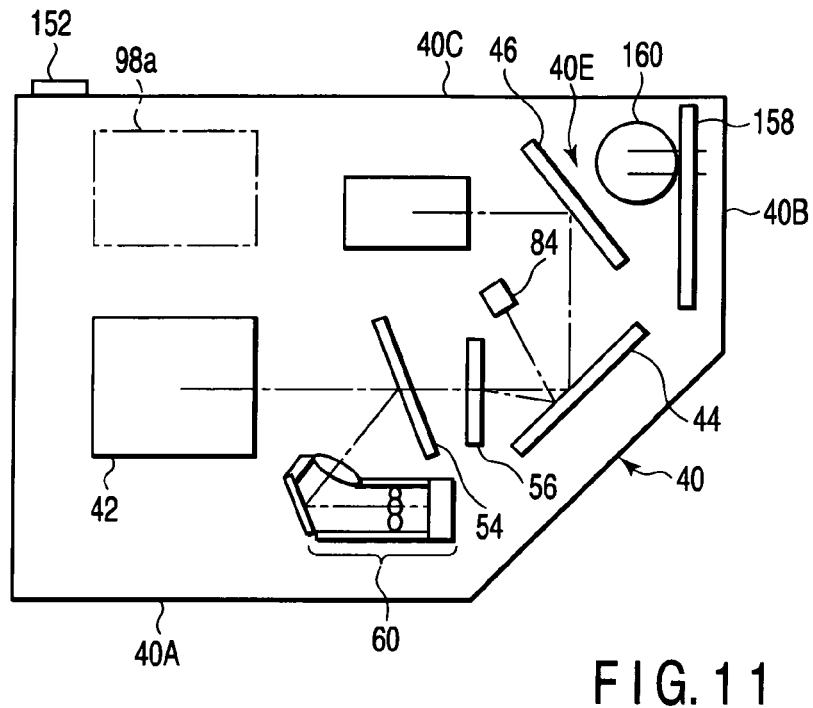
FIG. 11 is a front view from the photographing lens side, showing the layout in a viewfinder observation state in a modification of the fourth embodiment, i.e., a state wherein components of a viewfinder optical system and flash emission device are assembled in a camera body.
Figure 12:
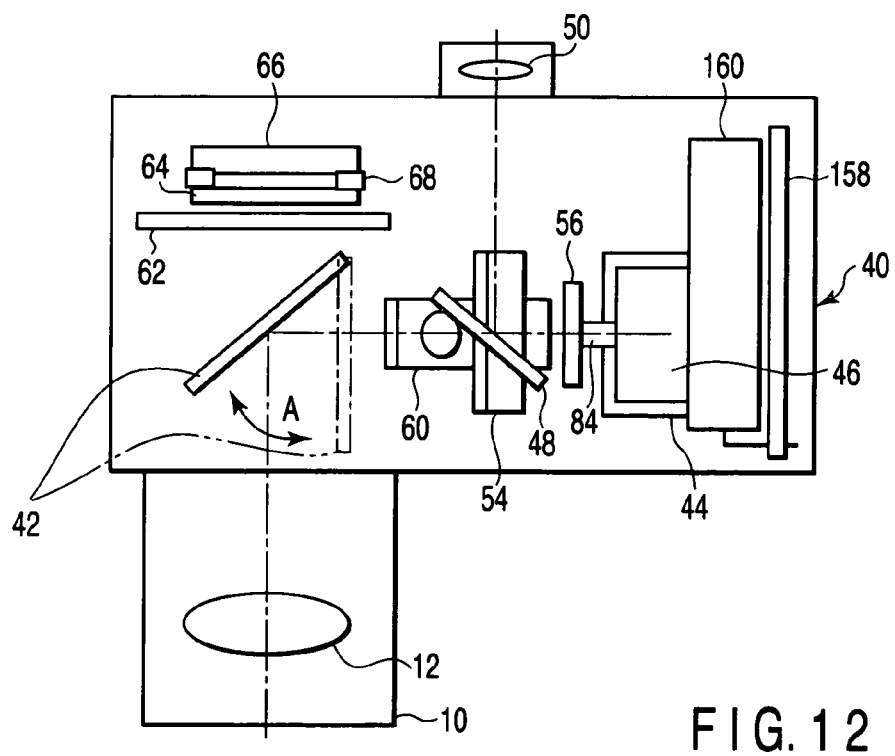
FIG. 12 is a view from the top surface side of the camera body, showing the layout in a viewfinder observation state in the modification of the fourth embodiment, i.e., a state wherein the components of the viewfinder optical system and flash emission device are assembled in the camera body.

FIGS. 11 and 12 show the layout in the viewfinder observation state in the modification of the fourth embodiment, i.e., in a state wherein components of the viewfinder optical system and flash emission device are built in the camera body. FIG. 11 is a front view from the photographing lens side, and FIG. 12 is a view from the top surface side of the camera body.

In the aforementioned fourth embodiment, the capacitor 160 for the flash emission device is arranged on the side opposite to (on the back surface side of) the second reflection surface of the second mirror 44. However, in this modification, the control board 158 and capacitor 160 for the flash emission device are arranged on the side opposite to (on the back surface side of) the third reflection surface of the third mirror 46. That is, the capacitor 160 for the flash emission device is arranged on a second triangular region 40E bounded by the third mirror 46 and the second and third side surfaces 40B and 40C, so that its longitudinal direction becomes substantially parallel to the optical axis of the lens unit 10. The control board 158 for the flash emission device is arranged on the back surface side of the third mirror 46 to be substantially parallel to the second side surface 40B.

In the fourth embodiment described above, the grip 150 is formed on the right side (left side in FIGS. 9 and 10) of the body unit 40. However, in this modification, no grip is formed. The release button 152 corresponding to the release switch of the camera operation switch 104 is provided on the top surface portion of the body unit 40.

Since other building components and operations of the camera system according to this embodiment are basically the same as those in the first to fourth embodiments mentioned above, the same reference numerals denote the same parts as those in FIGS. 1 to 10, and an illustration and description thereof will be omitted.

In this manner, the same effects as those in the fourth embodiment can be obtained when the capacitor 160 for the flash emission device is provided on the side opposite to the third reflection surface of the third mirror 46. In addition, since the grip is removed, further size and weight reductions can be achieved compared to the camera of the fourth embodiment.

Note that the modification of the fourth embodiment has exemplified the camera system in which the capacitor 160 for the flash emission device is provided on the side opposite to the third reflection surface of the third mirror 46, and the grip 150 is removed. However, the present invention is not limited to such specific arrangement. That is, the capacitor 160 for the flash emission device may be provided on the back surface side of either the second or third mirror 44 or 46. Furthermore, the grip may or may not be formed.

FIFTH EMBODIMENT

The fifth embodiment of the present invention will be described hereinafter.

Figure 13:
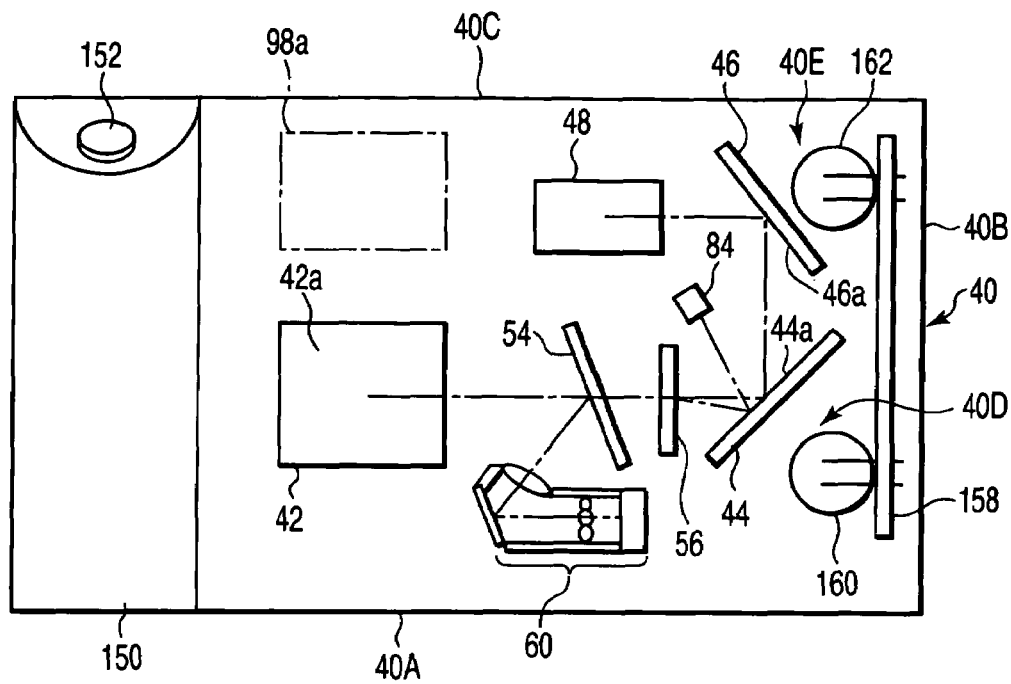
FIG. 13 is a front view from the photographing lens side, showing the layout in a viewfinder observation state in the fifth embodiment, i.e., a state wherein components of a viewfinder optical system and flash emission device are assembled in a camera body.
Figure 14:
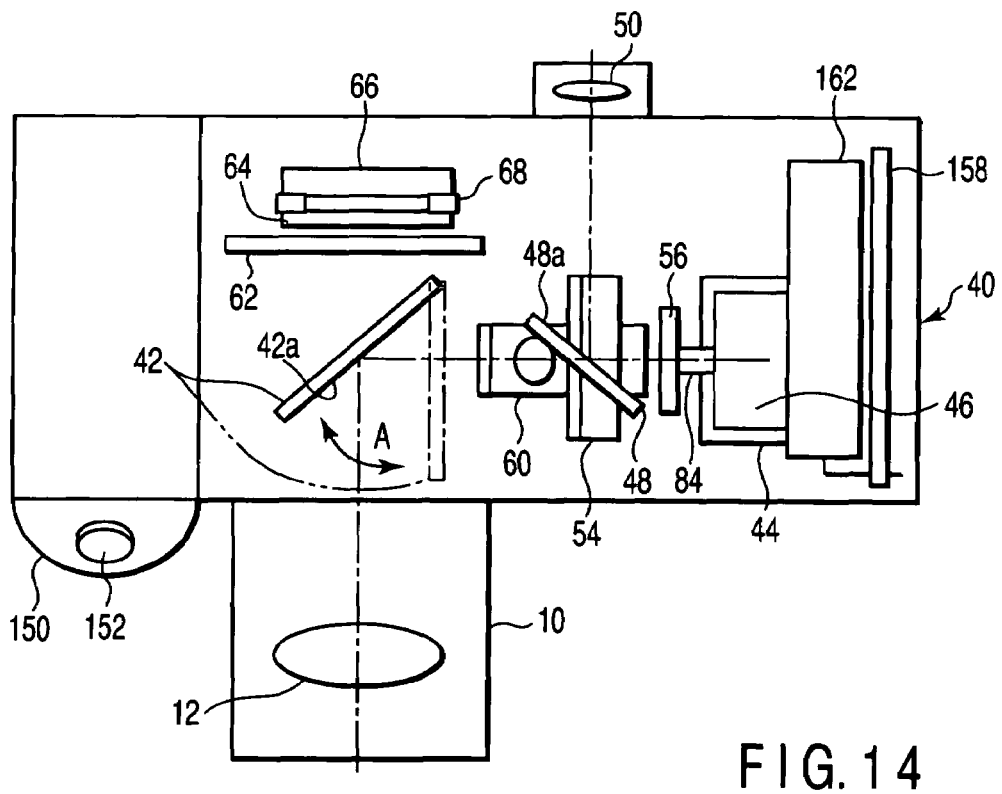
FIG. 14 is a view from the top surface side of the camera body, showing the layout in a viewfinder observation state in the fifth embodiment, i.e., a state wherein the components of the viewfinder optical system and flash emission device are assembled in the camera body.

FIGS. 13 and 14 show the layout in the viewfinder observation state in the fifth embodiment, i.e., in a state wherein components of the viewfinder optical system and flash emission device are built in the camera body. FIG. 13 is a front view from the photographing lens side, and FIG. 14 is a view from the top surface side of the camera body.

In the fourth embodiment described above, the capacitor 160 for the flash emission device is arranged on the back surface side of either the second or third mirror 44 or 46. However, in the fifth embodiment, capacitors for the flash emission device are arranged on the back surface side of both the second and third mirrors 44 and 46.

The fifth embodiment will be described below. However, the arrangement except for those of the capacitors 160 and 162 and the control board 158 for the flash emission device are basically the same as those of the camera systems according to the first to fourth embodiments and modification. Hence, as for these arrangement and operation, the same reference numerals denote the same parts and an illustration and description thereof will be omitted.

In FIGS. 13 and 14, the capacitor 160 for the flash emission device, which serves as a first charge accumulation member that forms the flash emission device 98, is arranged on the side opposite to (on the back surface side of) the second reflection surface 44a of the second mirror 44. Likewise, a capacitor 162 for the flash emission device, which serves as a second charge accumulation member that forms the flash emission device 98, is arranged on the side opposite to (on the back surface side of) the third reflection surface 46a of the third mirror 46. That is, the capacitor 160 for the flash emission device is arranged in the first triangular region 40D bounded by the second mirror 44, and the first and second side surfaces 40A and 40B, and the capacitor 162 for the flash emission device is arranged in the second triangular region 40E bounded by the third mirror 46 and the second and third side surfaces 40B and 40C.

The capacitors 160 and 162 for the flash emission device are mounted on and connected to the control board 158 for the flash emission device via lead wires and the like. Electronic parts (not shown) which form a control circuit for the flash emission device are mounted on the control board 158 for the flash emission device. The control board 158 for the flash emission device on which the capacitors 160 and 162 for the flash emission device are mounted is arranged on the back surface side of the second and third mirrors 44 and 46 to be substantially parallel to the second side surface 40B, and is attached to a main body member (not shown) in the body unit 40.

Note that the capacitors 160 and 162 for the flash emission device have nearly a columnar shape, and they have a cylindrical shape in this embodiment. The capacitors 160 and 162 for the flash emission device are arranged so that their longitudinal directions become nearly parallel to the optical axis of the lens unit 10.

As described above, according to the fifth embodiment, since the capacitors 160 and 162 for the flash emission device are arranged on the back surface side of both the second and third mirrors 44 and 46, the same effects as in the fourth embodiment can be obtained, and a strobe light emission amount can be increased without increasing the size of the camera body.

Of course, in the fifth embodiment as well, a grip may be removed as in the modification of the fourth embodiment although not shown.

SIXTH EMBODIMENT

The sixth embodiment of the present invention will be described hereinafter.

Figure 15:
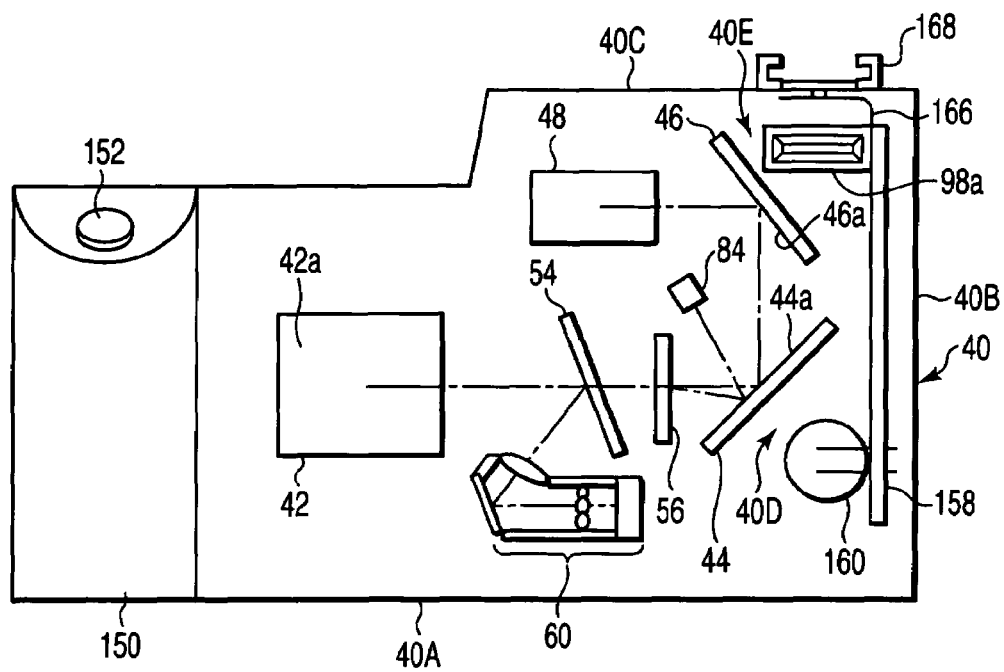
FIG. 15 is a front view from the photographing lens side, showing the layout in a viewfinder observation state in the sixth embodiment, i.e., a state wherein components of a viewfinder optical system and flash emission device are assembled in a camera body.
Figure 16:
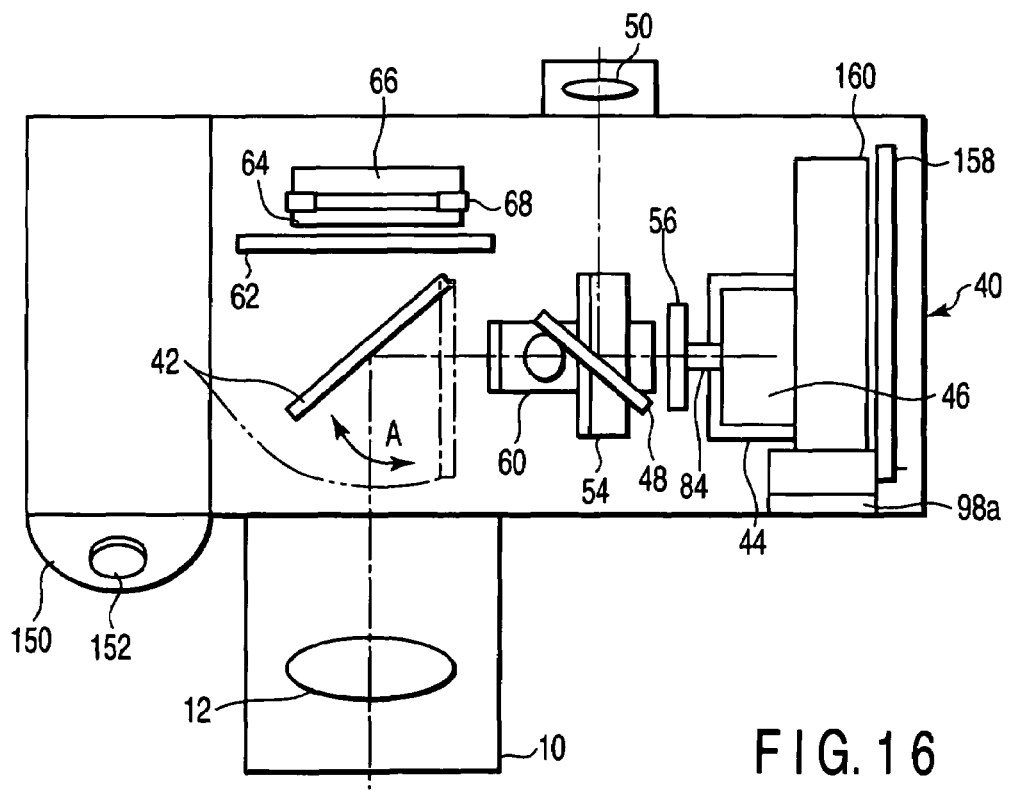
FIG. 16 is a view from the top surface side of the camera body, showing the layout in a viewfinder observation state in the sixth embodiment, i.e., a state wherein the components of the viewfinder optical system and flash emission device are assembled in the camera body.

FIGS. 15 and 16 show the layout in the viewfinder observation state in the sixth embodiment, i.e., in a state wherein components of the viewfinder optical system and flash emission device are built in the camera body. FIG. 15 is a front view from the photographing lens side, and FIG. 16 is a view from the top surface side of the camera body.

This sixth embodiment adopts an arrangement in which members which form the flash emission device 98 are arranged on the side opposite to the second reflection surface 44a of the second mirror 44 and on the side opposite to the third reflection surface 46a of the third mirror 46, compared to the fourth embodiment shown in FIGS. 9 and 10.

Note that the arrangement of the sixth embodiment is substantially the same as that of the fourth embodiment, except for the layout of members which form the flash emission device 98. Hence, as for the arrangements and operations of other portions, the same reference numerals denote the same parts and an illustration and description thereof will be omitted.

In FIGS. 15 and 16, the capacitor 160 for the flash emission device, which forms the flash emission device 98, is arranged on the side opposite to (on the back surface side of) the second reflection surface 44a of the second mirror 44. That is, the capacitor 160 for the flash emission device is arranged in the first triangular region 40D bounded by the second mirror 44, and the first and second side surfaces 40A and 40B. This capacitor 160 for the flash emission device is mounted on and connected to a control board 158 for the flash emission device via a lead wire and the like. Electronic parts (not shown) which form a control circuit for the flash emission device are mounted on the control board 158 for the flash emission device. The control board 158 for the flash emission device is arranged on the back surface side of the second and third mirrors 44 and 46 to be substantially parallel to the second side surface 40B, and is attached to a main body member (not shown) in the body unit 40.

A connection board 166 formed of a flexible circuit board is connected to one end side (upper side in FIG. 15) of the control board 158 for the flash emission device. A hot shoe 168 as an external device connection member which is provided to the exterior surface of the body unit 40 and to which an external flash emission device or the like can be detachably attached is connected to the connection board 166. The flash emission unit 98a which forms the flash emission device 98 is provided in the upper front surface portion of the body unit 40 near the connection board 166 and on the side opposite to the third reflection surface 46a of the third mirror 46. That is, a flash emission unit 98a is arranged in the second triangular region 40E bounded by the third mirror 46 and the second and third side surfaces 40B and 40C.

Note that the capacitor 160 for the flash emission device has nearly a columnar shape, and it has a cylindrical shape in this embodiment. The capacitor 160 for the flash emission device is arranged so that its longitudinal direction becomes nearly parallel to the optical axis of the lens unit 10.

In this way, in the sixth embodiment, since the flash emission unit 98a is separated away from the photographing lens 12 compared to the fourth and fifth embodiments, a so-called red-eye phenomenon upon photographing with flash emission can be reduced.

Since the flash emission unit 98a is arranged on the side opposite to the third reflection surface 46a of the third mirror 46, a portion above the quick return mirror 42 can be removed, and size and weight reductions of the camera can be achieved.

Furthermore, in the fourth and fifth embodiments described above, the flash emission unit 98a is located above the optical path of a light beam which comes from the photographing lens 12 to the quick return mirror 42. However, in the sixth embodiment, the flash emission unit 98a is arranged on the side where the control board 158 for the flash emission device to collect the building components of the flash emission device 98. Therefore, since the flash emission unit 98a is arranged in the vicinity of the control board 158 for the flash emission device, noise produced due to a large current that flows through the connection line to the flash emission unit 98a can be reduced.

An external flash emission device is normally connected to the hot shoe 168. Therefore, contacts used to exchange flash emission control signals are normally arranged on the hot shoe 168. In such case, according to this embodiment, since the hot shoe 168 is arranged in the vicinity of the control board 158 for the flash emission device, it is easy to lay out the contacts used to exchange flash emission control signals.

In the sixth embodiment, of course, the grip can be omitted as in the modification of the fourth embodiment, although not shown.

Furthermore, the aforementioned embodiments have exemplified the digital camera. However, the present invention is not limited to this, and can be applied to a single-lens reflex camera using a film.

As described above, a compact camera which allows efficient the space layout of the viewfinder optical system and flash emission device parts, and can reduce its height can be provided.

The embodiments of the present invention have been explained. However, various modifications of the present invention can be made without departing from the scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:
   an imaging optical system which forms an optical image of an object;
   a photoelectric conversion element which converts the optical image into an electrical signal;
   a first reflection mirror which is arranged between the photoelectric conversion element and the imaging optical system, and reflects a light beam coming from the imaging optical system in a direction that makes a substantially right angle with an optical axis of the imaging optical system, wherein the first reflection mirror reflects a light beam coming from the imaging optical system in a longitudinal direction of a photograph visual field range of the photoelectric conversion element, which is a direction that agrees with the longitudinal direction of the camera;
a switching mechanism which switches between a state wherein the first reflection mirror is located at a position between the photoelectric conversion element and the imaging optical system and in an optical path of the imaging optical system, and a state wherein the first reflection surface is retracted from the optical path of the imaging optical system;
a screen which is arranged on the reflection optical axis of the first reflection mirror and at an imaging position of the imagine optical system;
an optical path splitting element which is arranged on a reflection optical axis of the first reflection mirror, reflects at least some light components of the reflected light beam from the first reflection mirror in a predetermined direction, and allows some other light components of the reflected light beam from the first reflection mirror to pass through in a direction that agrees with the reflection optical axis of the first reflection mirror, wherein the optical path splitting element is arranged between the first reflection mirror and the screen;
a second reflection mirror, which is on the reflection optical axis of the first reflection mirror and is opposite to the first reflection mirror with reference to the screen, for reflecting the light beam, which is reflected by the first reflection mirror and is transmitted through the optical path splitting element, in a direction substantially perpendicular to a longitudinal direction of the camera;
a third reflection mirror which is arranged on a reflection optical axis of the second reflection mirror, and reflects the reflected light beam from the second reflection mirror in a direction which agrees with the longitudinal direction of the camera and is opposite to a reflection direction by the first reflection mirror;
a fourth reflection mirror which is arranged on a reflection optical axis of the third reflection mirror, and reflects the reflected light beam from the third reflection mirror in a backward direction of the camera;
an eyepiece optical system which is arranged on a reflection optical axis of the fourth reflection mirror, and is used to observe an image on the screen; and
a focal point position detection unit which detects a focal point position using the reflected light beam from the optical path splitting element.

2. A camera comprising:
a first reflection surface that reflects a light beam, which comes from an imaging optical system, in a first direction that is a longitudinal direction of a photographing visual field range;
a second reflection surface which is arranged on a reflection optical axis of the first reflection surface, and reflects the reflected light beam from the first reflection surface in a second direction substantially perpendicular to the first direction;
a third reflection surface which is arranged on a reflection optical axis of the second reflection surface, and reflects the reflected light beam from the second reflection surface in a third direction which is substantially parallel to the first direction and is opposite to the first direction;
a fourth reflection surface which is arranged on a reflection optical axis of the third reflection surface, and reflects the reflected light beam from the third reflection surface in a direction which substantially agrees with an incoming direction of the light beam which comes from the imaging optical system;
an eyepiece optical system which is arranged on a reflection optical axis of the fourth reflection surface and is used to observe an image formed by the imaging optical system;
a flash emission device which has an emission unit that emits light toward an object, the emission unit is arranged on a back surface side of the third reflection surface; and
a first charge accumulation member which accumulates a charge for causing the emission unit to emit light, the first charge accumulation member is arranged on the back surface side of the second reflection surface.

3. A camera according to claim 2, further comprising:
an electrical circuit board which is arranged to face the back surface side of the second and third reflection mirrors, and
wherein the first charge accumulation member and the emission unit are electrically connected to the electrical circuit board.

4. A camera according to claim 3, further comprising:
an external device connection portion which is arranged on an outer surface of the camera, and is used to mount at least an external flash emission device, and
wherein the external device connection portion is electrically connected to the electrical circuit board.

5. A camera comprising:
a grip which serves as a gripping portion of the camera;
an exterior member which has a first side surface which is substantially perpendicular to a side surface on the grip side, a second side surface which is substantially perpendicular to the first side surface and substantially faces the side surface on the grip side, and a third side surface which is substantially perpendicular to the second side surface, and substantially faces the first side surface;
a first reflection surface which reflects, in a first direction toward the second side surface side, a light beam coming from an imaging optical system;
a second reflection surface which is arranged on a reflection optical axis of the first reflection surface, and reflects the reflected light beam from the first reflection surface in a second direction which is substantially perpendicular to the first direction and is directed to the third side surface;
a third reflection surface which is arranged on a reflection optical axis of the second reflection surface, and reflects the reflected light beam from the second reflection surface in a third direction which is substantially parallel to the first direction and is directed to the grip side;
a fourth reflection surface which is arranged on a reflection optical axis of the third reflection surface, and reflects the reflected light beam from the third reflection surface in a direction which substantially agrees with an incoming direction of the light beam coming from the imaging optical system;
an eyepiece optical system which is arranged on a reflection optical axis of the fourth reflection surface, and is used to observe an image formed by the imaging optical system;
a flash emission device which has an emission unit that emits light toward an object;
a first charge accumulation member which accumulates a charge for causing the emission unit to emit light;
an electrical circuit board which is arranged to face the back surface side of the second and third reflection mirrors and to extend along the second side surface; and an external device connection portion which is arranged on the third side surface, and is used to mount at least an external flash emission device, and wherein the first charge accumulation member is arranged in a first triangular region bounded by the second reflection surface and the first and second side surfaces, the emission unit is arranged in a second triangular region bounded by the third reflection surface and the second and third side surfaces, and the first charge accumulation member, the emission unit, and the external device connection portion are electrically connected to the electrical circuit board.

6. A camera according to claim 5, wherein the first side surface corresponds to a bottom surface of the camera and the third side surface corresponds to a top surface of the camera while the camera is held.

* * * * *